(12) United States Patent
Francis et al.

(10) Patent No.: US 12,189,845 B2
(45) Date of Patent: Jan. 7, 2025

(54) SYSTEMS AND METHODS FOR HANDS-FREE SCROLLING BASED ON A DETECTED USER READING ACTIVITY

(71) Applicant: Athena Accessible Technology, Inc., San Mateo, CA (US)

(72) Inventors: Blake Francis, Redwood City, CA (US); Stephen Mattison, Bellingham, WA (US); David Chiu, Morgan Hill, CA (US)

(73) Assignee: Athena Accessible Technology, Inc., San Mateo, CA (US)

( * ) Notice: Subject to any disclaimer, the term of this patent is extended or adjusted under 35 U.S.C. 154(b) by 0 days.

(21) Appl. No.: 18/233,290

(22) Filed: Aug. 11, 2023

(65) Prior Publication Data

US 2023/0400918 A1 Dec. 14, 2023

Related U.S. Application Data

(63) Continuation-in-part of application No. 17/671,534, filed on Feb. 14, 2022, now Pat. No. 11,775,060.

(60) Provisional application No. 63/149,958, filed on Feb. 16, 2021.

(51) Int. Cl.
*G06F 3/01* (2006.01)
*G06F 3/0485* (2022.01)
*G06F 3/04886* (2022.01)

(52) U.S. Cl.
CPC ............ *G06F 3/013* (2013.01); *G06F 3/0485* (2013.01); *G06F 3/04886* (2013.01)

(58) Field of Classification Search
CPC ........... G06F 2203/04803; G06F 3/013; G06F 3/04842; G06F 3/0485; G06F 3/04886; G06F 18/23; G06F 3/0481
See application file for complete search history.

(56) References Cited

U.S. PATENT DOCUMENTS

| | | |
|---|---|---|
| 5,850,211 A | 12/1998 | Tognazzini |
| 6,421,064 B1 | 7/2002 | Lemelson et al. |
| 6,886,137 B2 | 4/2005 | Peck et al. |
| 8,643,680 B2 | 2/2014 | Baldwin et al. |
| 9,148,537 B1 | 9/2015 | Currey et al. |
| 9,335,819 B1 | 5/2016 | Jaeger et al. |
| 9,430,141 B1 | 8/2016 | Lu et al. |
| 9,606,622 B1 | 3/2017 | Brothers et al. |
| 9,817,477 B1 | 11/2017 | Taylor et al. |
| 9,946,338 B2 | 4/2018 | Hayashi et al. |
| 9,990,109 B2 | 6/2018 | Yoshizawa et al. |
| 10,009,603 B2 | 6/2018 | Kellerman et al. |
| 10,082,863 B2 | 9/2018 | Kempinski |
| 10,306,311 B1 | 5/2019 | Knas et al. |
| 10,317,994 B2 | 6/2019 | Abraham et al. |

(Continued)

*Primary Examiner* — Richard J Hong
(74) *Attorney, Agent, or Firm* — Carr & Ferrell LLP

(57) ABSTRACT

Systems and methods for hands-free scrolling are disclosed herein. An example method includes detecting an eye movement or gaze of a user relative to content displayed on a display screen of the computing device, the content being arranged along a y axis of the display screen, determining that the user has viewed a portion of the content provided on the display screen and where along the y axis the eye movement or gaze is directed; and automatically scrolling the content on the display in response to the eye movement or gaze of the user in relation to the y axis.

20 Claims, 17 Drawing Sheets

(56) References Cited

U.S. PATENT DOCUMENTS

| | | |
|---|---|---|
| 10,409,366 B2 | 9/2019 | Berl et al. |
| 11,775,060 B2 | 10/2023 | Francis et al. |
| 2006/0075358 A1* | 4/2006 | Ahokas ................ G06F 3/0485 |
| | | 715/786 |
| 2011/0006978 A1* | 1/2011 | Yuan .................... G06F 3/0481 |
| | | 351/209 |
| 2012/0256967 A1 | 10/2012 | Baldwin et al. |
| 2013/0232444 A1 | 9/2013 | Hegde |
| 2014/0002352 A1 | 1/2014 | Jacob et al. |
| 2014/0125585 A1 | 5/2014 | Song et al. |
| 2014/0268054 A1 | 9/2014 | Olsson et al. |
| 2015/0128075 A1 | 5/2015 | Kempinski |
| 2015/0206321 A1 | 7/2015 | Scavezze et al. |
| 2015/0309565 A1 | 10/2015 | Beri et al. |
| 2016/0109946 A1 | 4/2016 | George-Svahn |
| 2016/0124505 A1 | 5/2016 | Liu |
| 2016/0132752 A1* | 5/2016 | Qvarfordt ............... G06F 18/23 |
| | | 382/103 |
| 2016/0171277 A1 | 6/2016 | Flaw et al. |
| 2016/0179361 A1 | 6/2016 | Gujarathi et al. |
| 2016/0259405 A1 | 9/2016 | Wilson et al. |
| 2017/0212583 A1 | 7/2017 | Krasadakis |
| 2017/0228018 A1 | 8/2017 | Schaeferjohann |
| 2017/0235360 A1 | 8/2017 | George-Svahn |
| 2018/0165792 A1 | 6/2018 | Tavakoll et al. |
| 2018/0307307 A1 | 10/2018 | Schmidt |
| 2020/0074724 A1 | 3/2020 | Mathur et al. |
| 2020/0364539 A1* | 11/2020 | Anisimov ............... G06F 3/011 |
| 2022/0206575 A1* | 6/2022 | Zhao ........................ G06F 3/013 |
| 2022/0261073 A1 | 8/2022 | Francis et al. |

\* cited by examiner

SYSTEMS AND METHODS FOR HANDS-FREE SCROLLING BASED ON A DETECTED USER READING ACTIVITY

CROSS REFERENCE TO RELATED APPLICATIONS

This application is a continuation-in-part of U.S. patent application Ser. No. 17/671,534, filed Feb. 14, 2022, which claims the benefit and priority of U.S. Provisional Application Ser. No. 63/149,958, filed on Feb. 16, 2021, the disclosures of which are hereby incorporated by reference for all purposes.

SUMMARY

According to some embodiments, the present disclosure is directed to a method comprising detecting an eye movement or gaze of a user relative to content displayed on a display screen of the computing device, the content being arranged along a y axis of the display screen; determining that the user has read or viewed a portion of the content provided on the display screen and where along the y axis the eye movement or gaze is directed; and automatically scrolling the content on the display in response to the eye movement or gaze of the user in relation to the y axis.

According to some embodiments, the present disclosure is directed to a system comprising a display; an eye tracking device; and a controller comprising: a memory; and a processor communicatively coupled to the memory the memory storing instructions executable by the processor to detect, using output from the eye tracking device, eye movement of a user relative to content displayed on the display; determine that the user has viewed a portion of the content provided on the display; and automatically scroll the content displayed in such a way that the user is not required to manually scroll the content.

According to some embodiments, an example method can include establishing a plurality of zones for a display, presenting content on a display that includes lines of textual content, the display being segmented into one or more of the plurality of zones, tracking eye movement or gaze of an eye of a user who is reading the lines of textual content on the display, along with which of the plurality of zones the content is located within, and automatically scrolling the lines of textual content as the reader reads the lines of textual content as determined from the eye movement or gaze, wherein the automatic scrolling is based on scrolling parameters, each of the plurality of zones having different scrolling parameters.

BRIEF DESCRIPTION OF THE DRAWINGS

Exemplary embodiments are illustrated by way of example and not limitation in the figures of the accompanying drawings, in which like references indicate similar elements.

DETAILED DESCRIPTION OF EMBODIMENTS

Overview

Figure 1A:
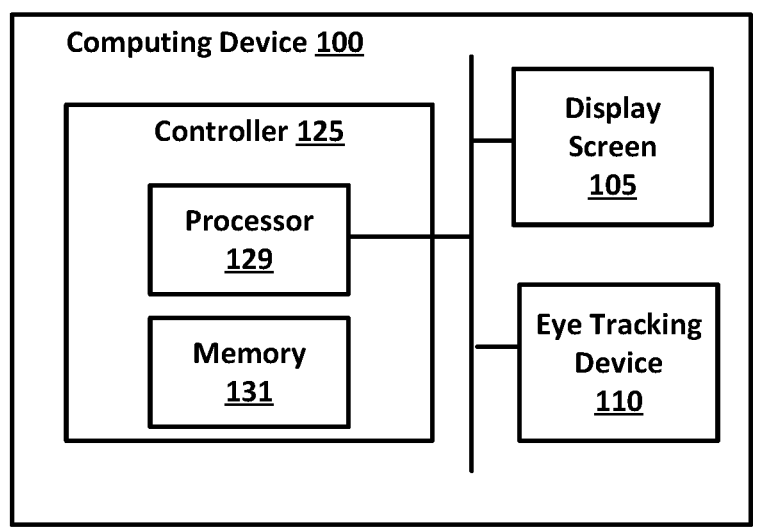
FIG. 1A illustrates an example schematic of a device that can be used to practice aspects of the present disclosure.

Traditional scrolling mechanisms are cumbersome, inefficient, unnecessary, can cause injury (such as repetitive use), and detracts from the user being able to consume and retain digital content. Traditional scrolling inputs are also limiting to people with disabilities, particularity of their fingers, hands, or arms. The present disclosure solves these issues, by providing systems and methods for performing hands-free scrolling while a user reads or views content on their computing device by tracking eye gaze.

Specifically, the technology allows for hands-free scrolling to reveal additional text or content to a user who is actively reading or viewing digital content on a computing device, such as a mobile phone, tablet, laptop, or any other type of computer having a display screen and a front-facing camera or other eye tracking device or apparatus. The computing device and displays can include both virtual reality and/or augmented reality devices.

The hands-free scrolling may, in some embodiments, provide the content at the rate that the user is reading as determined by the controller. The content being read by the user may include any type of content, including but not limited to, emails, news articles, electronic books, documents, webpage content, any text, ads, text messages, photos, and the like.

An example controller can be implemented by way of an application that is downloaded onto the computing device. In another embodiment the application can be integrated as a feature inside a web browser, a reader application, or alternatively, the controller can be implemented by way of an application that is part of the computing device's operating system. The controller utilizes a camera, virtual reality googles, an eye tracking device or any other type of device that can track eye movements, coupled to the computing device to track a user's eye(s) while reading or viewing of content. In some embodiments, the controller can utilize biometrics (or infrared) or any component that tracks facial features of the user, to enhance the accuracy of its detection and tracking of the user's eye(s) or direction of the user's gaze. In further embodiments, the controller can determine the reading or scrolling patterns/habits of a given user and incorporate that information in the controller's settings or tolerances in automatic scrolling, to mimic or adjust the hands-free scrolling to correspond with the user's patterns/habits. This in turn enhances the reading experience of the user. For example, if a user typically reads five lines of text or a full paragraph before scrolling, the automatic scroll process could mimic this behavior.

EXAMPLE EMBODIMENTS

In one embodiment, once the controller tracks and determines that the user's eye(s) are moving right to left or alternatively, left to right, back and forth, line by line, similar to the movement that a typewriter performs upon input of a carriage return, then the controller determines that the user is actively reading and commands the computing device to scroll such as to reveal additional content or text to the user, without the user having to touch the computing device. That is, if the controller determines that the user's eye(s) have gone from left to right, and then left, the controller determines that the user has read one line of text. In further embodiments, the controller can determine if the user's eye(s) has gone up and down in the case of vertical content or text.

It will be understood that the present disclosure will generally refer to eye movement. This can include a pattern of eye movements, eye gaze, eye gestures, each of which will be described in greater detail infra.

Figure 1B:
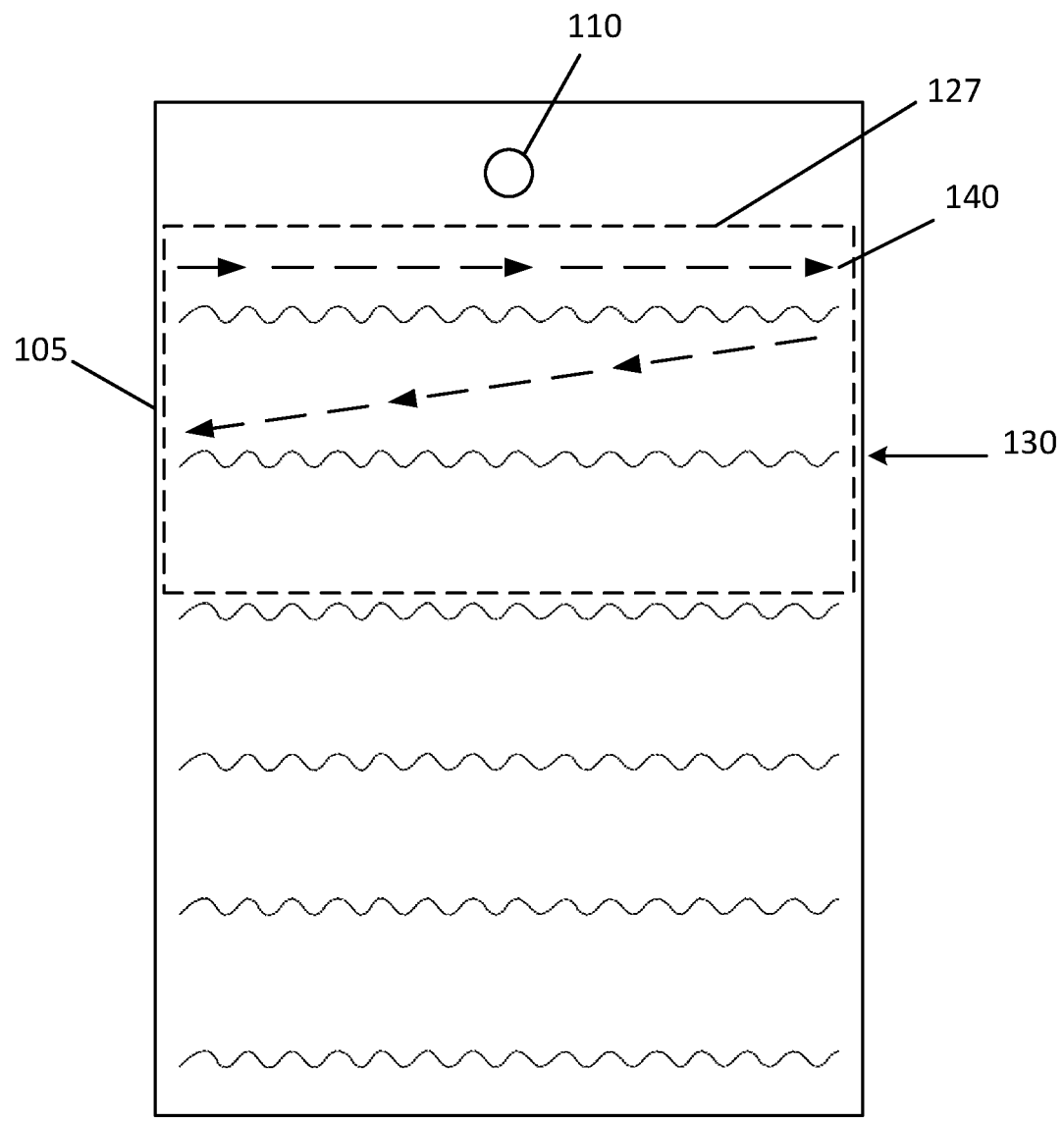
FIG. 1B illustrates an example device providing eye tracking and text scrolling.
Figure 1C:
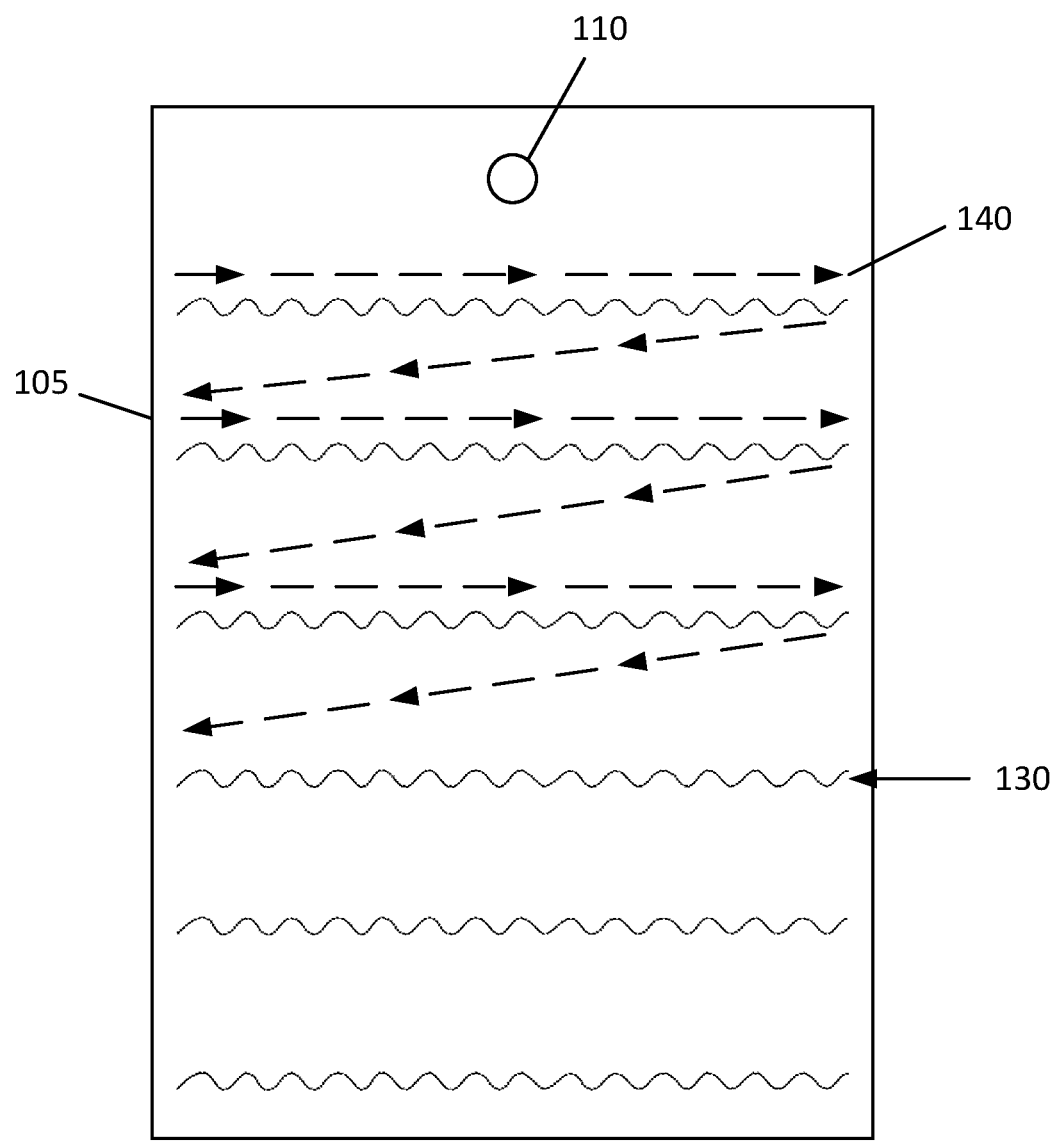
FIG. 1C illustrates another example device providing eye tracking and text scrolling.

Referring now to FIGS. 1A-1C collectively, which depict a block diagram of an exemplary architecture for hands-free scrolling, in accordance with certain embodiments of the present disclosure. As mentioned previously, the technology allows for hands-free scrolling to reveal additional text or content to a user who is actively reading or viewing content on a computing device 100, such as a mobile phone, digital screen, computer, glasses, heads-up display, tablet, laptop, or any other type of computer having a display screen 105 and a front-facing camera, or eye tracking device 110. The display screen 105 is configured to display any type of content, including but not limited to one or more lines of text 130.

For purposes of brevity and clarity, each of the embodiments may refer to operations performed by a controller. Thus, the computing device 100 can include a controller 125 having at least a processor 129 and memory 131. Broadly, the controller 125 is configured to provide the eye gaze tracking, scrolling, eye gesture features disclosed herein. The controller 125 can include a dedicated device that is specifically configured to enable the features of the present disclosure. In other embodiments, the controller 125 is an existing controller of the computing device 100 that can execute instructions stored in memory, such as an application.

Initially, the controller 125 can implement a calibration protocol. The controller 125 can cause the presentation of a calibration UI on the display. During this presentation, the controller 125 can determine, based on images obtained from the eye tracking device 110 when the user is looking at different points, symbols, words, or pictures, that are highlighted on the display, to improve gaze accuracy for that user. In some embodiments, the controller 125 can display lines of scrolling text and track user eye gaze to determine how quickly the reader is reading the content. In some embodiments, the controller 125 can display lines of text to track the user eye movement pattern while reading.

In yet another embodiment, the controller tracks the location of a user's face in relation to the computing device. For example, the controller can determine where the user's face is located in relation to the computing device. The controller can determine if the user's face is located parallel to the screen of the computing device, as opposed to if the user's face is above, below or sideways in relation to the computing device, and also how far the user's face is from the screen. In other words, the controller can utilize such face-tracking mechanisms to determine where the user's eyes are focused on the screen, and then based on this information, the controller can determine if further hands-free scrolling is needed.

In yet a further embodiment, the controller determines the width of a user's eyes (how far apart a user's eyes are) to determine if hands-free scrolling is needed. For instance, if a user's eyes are further apart, then that user's eye movements may be shorter, and this can be detected by the controller.

In another embodiment, the controller can determine and track the sequence and/or the speed of a user's eye movements while they are reading text of one line, from left to right. The controller can determine and track the sequence and/or the speed of a user's eye movements while they are reaching the end of one line, and moving to the beginning of the next line. Based on these sequences, the controller can determine whether hands-free scrolling should be performed.

In some embodiments, the controller can make adjustments such as to compensate for a user wearing glasses, by handling refraction and/or reflection difficulties that can occur in such situations. Also, the controller can make adjustments where brightness or lighting issues arise.

The controller 125 can calculate a gaze estimation using head/face position relative to the device or display. For example, the controller 125 can determine that the user has viewed a portion of content presented in a target reading area of the display screen.

The controller 125 can determine that the user has viewed a portion of the content in a target reading area 127 of the display screen. The controller 125 can automatically scroll the content displayed in the target reading area 127.

The controller 125 can adjust scrolling behavior based on what is being displayed. When the controller 125 detects that there is no text on the display or mostly images, controller 125 can cause content to be scrolled based on gaze location focused on the top or bottom of the display. In some embodiments, scrolling can be accomplished by the controller 125 based on eye gesture detection. In yet other embodiments, the controller 125 can scroll UI content based on y coordinate reading detection. For example, if a line is read on the same y axis more than once, scrolling can stop as this would indicate the user is rereading the same line again. Stated otherwise, the display screen can be logically segmented off into a plurality of zones. The zones are arranged along a vertical axis, and can also be arranged along a horizontal axis as well. In some embodiments, the automatically scrolling of content can occur as the reader reads the content. This can be determined from the eye movement or gaze. In these instances, the automatic scrolling is based on scrolling parameters, each of the plurality of zones having different scrolling parameters. For example, viewing a first zone may cause the scrolling to occur at a first speed, whereas viewing content in a second zone may cause the scrolling to occur at a second speed. Viewing content in a third zone may cause the scrolling to occur at a third speed or the turning of a page (when paginated content is being viewed). Again, these are all merely examples, and the overall advantage is that each of the zones can be associated with scrolling parameters that produce a different scrolling behavior.

Still referring to FIG. 1A, the controller 125 tracks and determines that the user's eye(s) are moving right to left or alternatively, left to right, back and forth, line by line, with the assistance of the front-facing camera or eye tracking device 110. The eye tracking device 110 can comprise any combination of hardware and/or software that allows for the tracking of eye movement(s), eye gaze(s), using any technology that can be used to track the same.

Once the controller 125 determines that the user is actively reading, the controller 125 commands the computing device to scroll such as to reveal additional content or text to the user, without the user having to touch the computing device. Typically, the scrolling is in a downward or southward direction towards the bottom of the display screen. However, one skilled in the art can appreciate that scrolling can be in any direction and is not limited to a downward direction. In FIG. 1A, the controller 125 tracks and determines that the user's eye(s) are reading left to right, back and forth, in the direction of the arrows 140 depicted in FIG. 1B.

The controller 125 can provide this hands-free scrolling when it tracks and determines that the user's eye(s) have moved from the end of one line to the beginning of the next line of text that is displayed on the screen of the computing device. As the user's eye(s) are moving in this manner, and the controller 125 is following the direction of the user's eye(s), the controller 125 can control the computing device to display an appropriate amount of additional text that follows the text that is being currently read by the user.

For instance, FIG. 1C shows that the user has read three lines of text in a path depicted by the arrows 140 of FIG. 1C. Accordingly, the controller 125 will command the display to scroll another three lines of text 130. One skilled in the art that the number of lines of text 130 is not limited to just the number three, but instead, the controller 125 will determine the appropriate amount of additional text or lines of text that will be supplied to the user who is actively reading content based on a number of factors.

In some embodiments, the controller 125 further implements different tolerances to determine how much scrolling is needed, based on factors such as text size, the text and/or content that is being presented on the display, whether images and/or text are being displayed on the screen, line spacing and the like.

In various embodiments, the controller 125 can be configured to utilize machine learning, neural networks, artificial intelligence, and the like to evaluate screenshots of information provided on a UI to determine the contents of the UI. The screenshots can be fed into a trained neural network to identify UI elements on the screen in real-time. The controller can be configured to detect UI elements, texts, images or other content of on-screen display. In some instances, the controller 125 can utilize optical character recognition or other text scraping/identifying features to detect textual content and/or images. In some embodiments, UI element enumeration can be provided by target OS (operating system) including iPhone and android, which can be useful when an integrating application has source code access.

Figure 2:
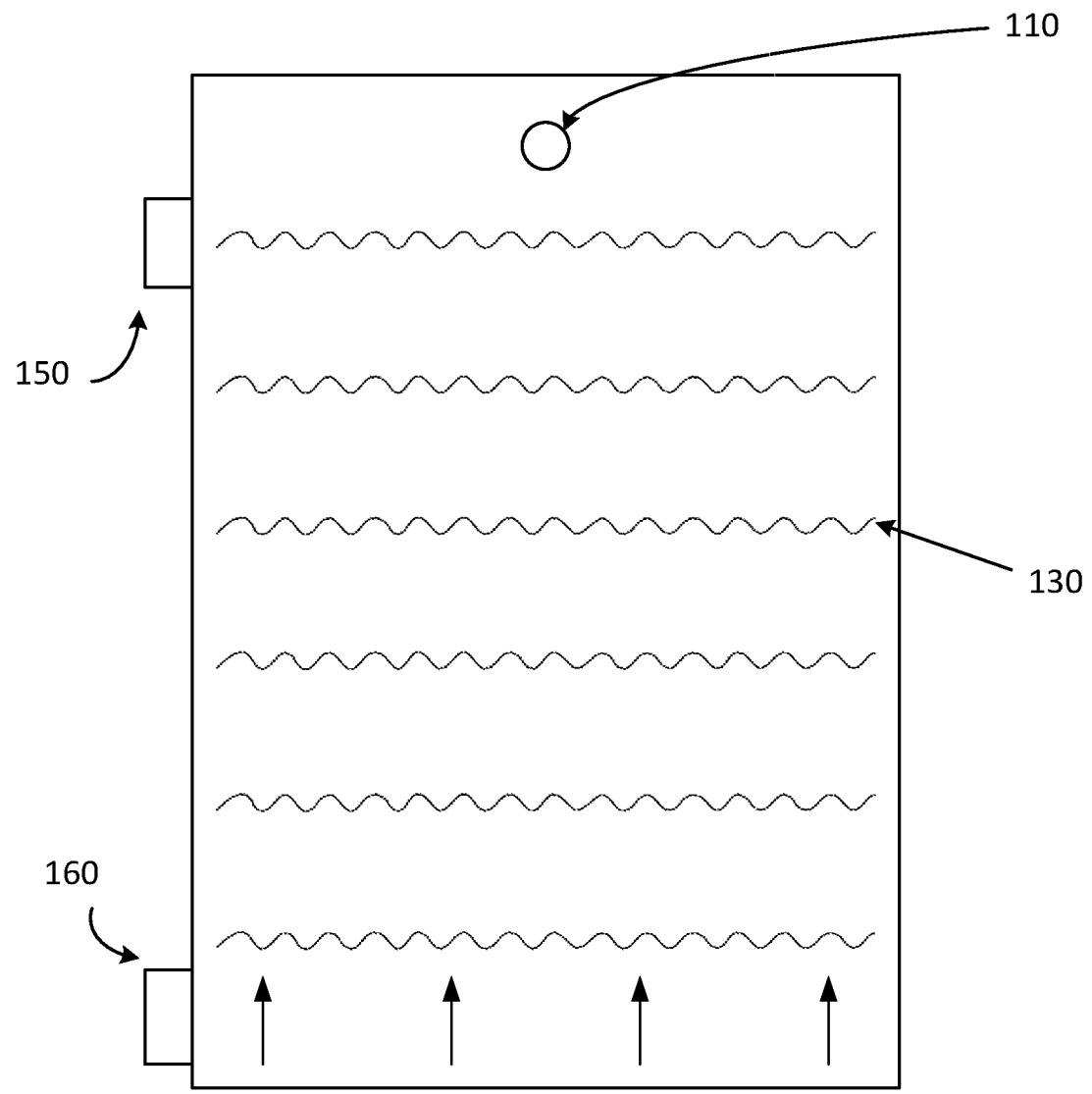
FIG. 2 illustrates dynamically detection of a given parameter such as line height, based on font size, line spacing, images and so forth.

In further embodiments, as shown in exemplary FIG. 2, the controller 125 is configured to dynamically detect a given parameter such as line height 150, based on font size, line spacing, images, and so forth. The controller 125 can determine the line height 150 or the number of pixels for a given line of text 130. Once the controller 125 makes this determination, the controller 125 can further adjust the scroll distance 160 depending on the line height 150 that was determined by the controller 125.

In yet another example, the controller 125 can determine that the user has read five lines of text, then tracks that the user's eye(s) are looking at image displayed on the screen, and then tracks that the user is reading an additional three lines of text. Again, one skilled in the art can recognize that the controller 125 can determine any number of lines read by the user, and that the technology is not limited to merely five or three lines of text. In that example, the controller 125 will determine that the user is still reading despite having glanced at an image, and will display additional text and/or content that follows the three lines of text that were last read by the user. The controller 125 can also determine that scrolling should occur based on the content that is being displayed on the screen.

In another embodiment, the controller 125 tracks and determines that the user's eye(s) are focused on location of the screen (such as the top, middle or bottom portion of a display screen) or a zone. Based on that determination, the controller 125 can then determine that the scrolling distance should be increased, decreased, or stopped.

Figure 3:
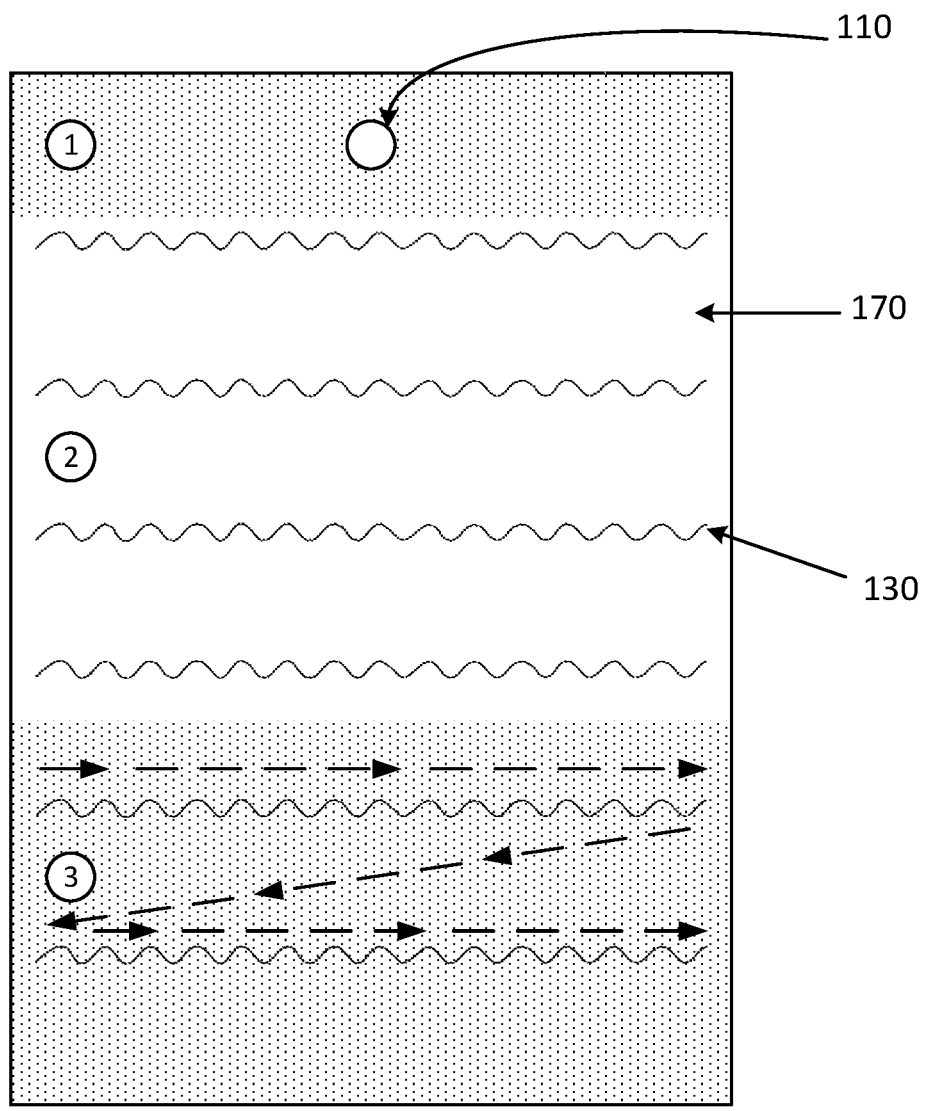
FIG. 3 illustrates a display with a plurality of zones.

FIG. 3 illustrates three exemplary zones or areas (Zone 1, Zone 2 and Zone 3) are depicted on the display screen. If the controller 125 determines that the user's gaze is focused on Zone 1, or that the user is reading text 130 in Zone 1 (which in this case is the top of the display), the controller 125 may not start hands-free scrolling, decrease the scrolling distance, or stop the hands-free scrolling altogether, until the controller 125 detects that the user is now reading text 130 in Zone 2.

In some embodiments, the zone parameters pertaining to Zone 1 are selected to prevent the controller from scrolling too far or too quickly before the user has had a change to read or view content. This helps keep the content in the desired viewing/reading area.

Alternatively, the controller 125 may slow down the hands-free scrolling or stop the hands-free scrolling altogether, until the user's gaze or eye(s) are detected to be focused in a desired (target) reading area 170 or if it is detected by the controller 125 that the user is reading in the desired reading area 170. The desired reading area 170 may be automatically determined by the controller 125 or it may be manually configured by the user through settings provided by the controller 125. For example, some users prefer to read text that is located at the top of the display screen, and therefore they may select that their desired reading area 170 is close to the top of the screen (such as the top ⅓ of the screen). On a tablet, computer, or a phone in landscape mode, the controller 125 may provide the content or text in a newspaper setting, where the content or text is provided in a newspaper layout (such as two narrow columns).

In another embodiment, in FIG. 3, the controller 125 may detect the user's eye(s) or gaze is focused on Zone 3 while the user is actively reading (which in this case is the bottom portion of the display screen). In this case, the controller 125 may increase the hands-free scrolling distance until the user's eye(s) or gaze is detected in Zone 2 or in the desired reading area 170. For example, the controller could scroll two lines of text for every one line of text that the user reads. In some instances, the parameters pertaining to Zone 3 ensure that the user does not run out of content or is not reading faster than the system is scrolling.

Figure 4:
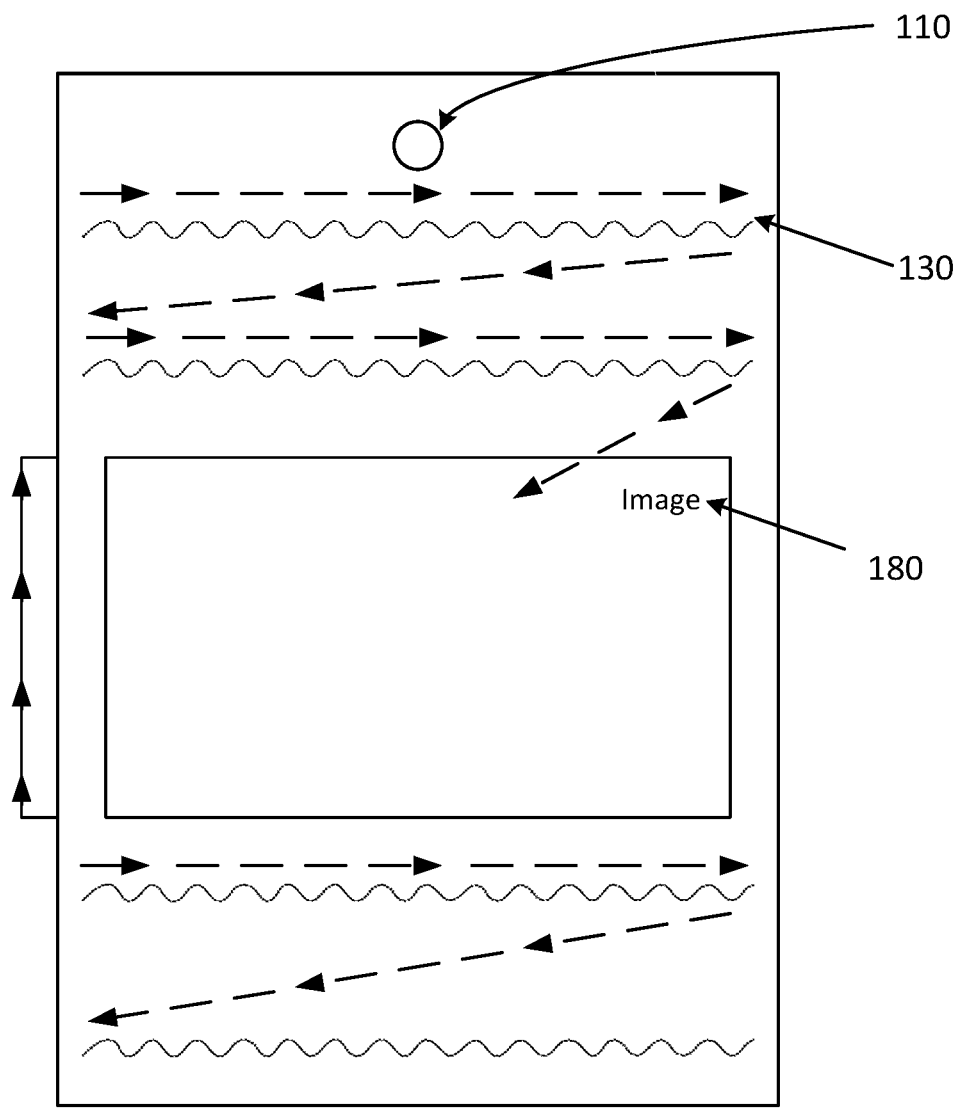
FIG. 4 illustrates aspects of eye tracking and dimensions of content on a display.

In a further embodiment, as shown in exemplary FIG. 4, the controller 125 may detect that the user is reading content or text 130 on the display screen of their computing device, again with the assistance of the camera or eye tracking device 110, and the automatic scroll is active. The user reads the content and once the user's eye(s) or gaze reaches an image 180, the controller will stop scrolling or slow down the speed of the scrolling. Once the controller 125 detects that the user is reading again, below or after the image, the controller 125 will scroll the equivalent distance as that of the size of the image 180. In other words, the controller 125 will provide hands-free scrolling of content or text that is the equivalent distance as that of the size of the image 180. In the exemplary case of FIG. 4, the controller 125 determines the dimensions, including the height, of the image 180, and based on that determination, the controller 125 can determine how many pixels are in a line of text or how many pixels are on a given page of content, and scrolls a given number or preset number of pixels once the user continues reading past the image 180. In one embodiment, the controller 125 can scroll a distance that is equal to the height of the image, once the user continues reading past the image 180.

Exemplary embodiments allow for continuous hands-free scrolling, regardless of whether the user has reached the end of a chapter or passage of content/text. Further embodiments allow for the controller 125 to determine how many lines of text that a user has read and provide the same number of lines of upcoming text or upcoming content. Also, the controller 125 can track the user's gaze, to determine if the user has skipped text, such that the controller 125 will increase the amount of scrolling (e.g., scroll distance) or the scrolling speed, such that the controller follows the direction of the user's gaze on the display screen.

Still referring to FIG. 4, if the initial screen or landing page begins with an image 180 at the top of the display, followed by text 130, once the controller 125 determines that the user has begun actively reading the content, the controller 125 can scroll an equivalent distance to the size of the image 180. In some embodiments, if the user's eye(s) or gaze reaches an advertisement shown on the display screen, and if the user had selected a mode called "Skip Ads" mode through the controller 125 (which is provided in the graphical user interface depicted in FIG. 5), then the controller 125 will automatically scroll the equivalent distance to the size of the advertisement that the user's eye(s) or gaze had reached.

Figure 5:
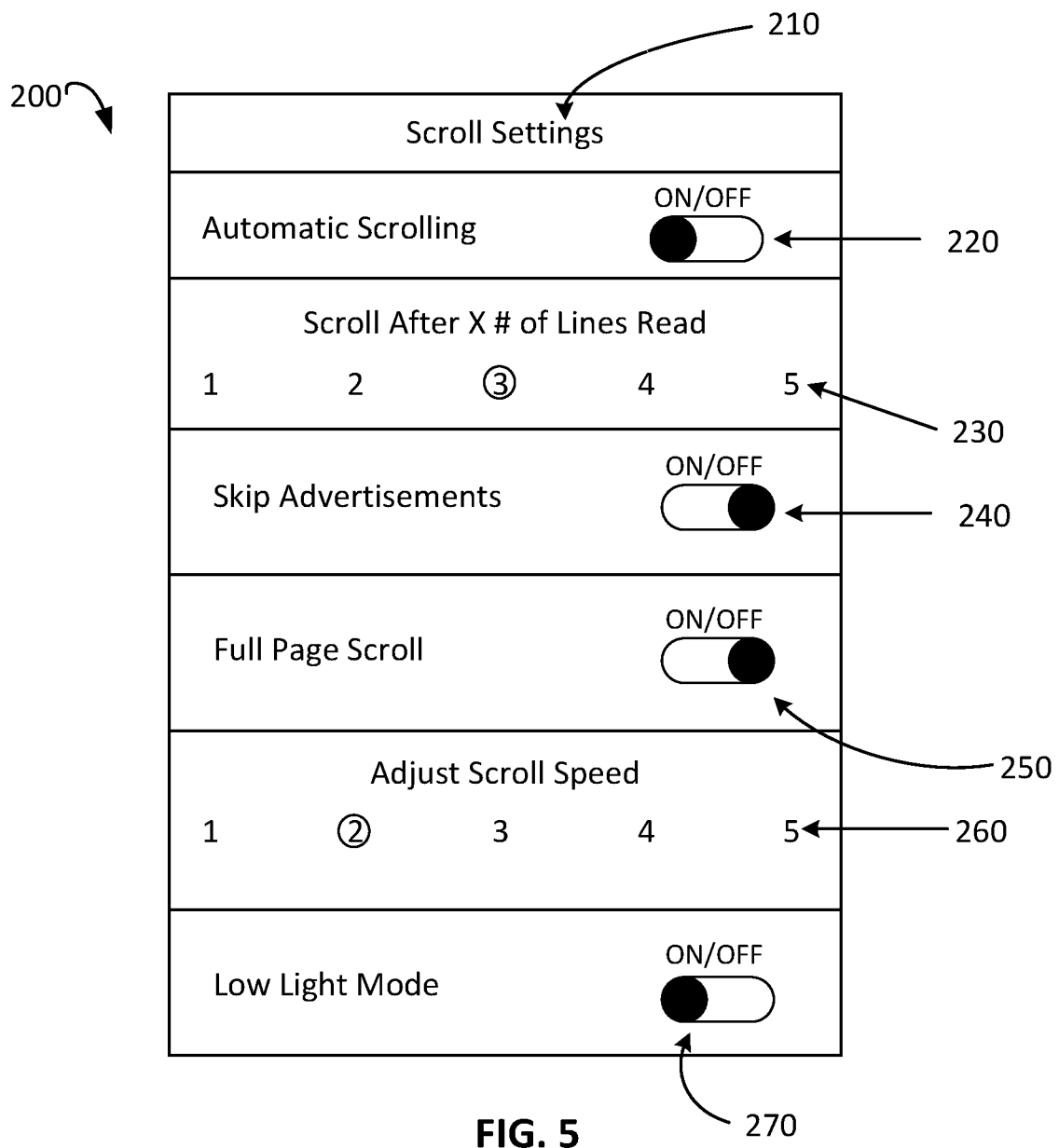
FIG. 5 illustrates an example menu or user interface that allows a user to select eye movement-based scrolling preferences.

FIG. 5 depicts an exemplary graphical user interface (GUI) 200 that is provided by the controller 125. While this describes a UI that allows a user to preselect preferences, the controller 125 can be pre-programmed with predetermined settings or default settings which do not require the user to make settings selections.

The GUI 200 comprises a scroll setting menu 210, and in the example provided in FIG. 5, the menu 210 provides six settings which the user can select. First, the user can select whether automatic scrolling should be on or off by sliding the on/off button 220 left or right. In the example shown in FIG. 5, the user has selected that the automatic scrolling is on. Next, the user can change how often the controller 125 scrolls by selecting a number 230 displayed on the GUI 200. In the example shown in FIG. 5, the user has selected that the controller 125 should scroll after 3 lines of text are read.

Thus, the controller allows the user to manually adjust how the screen automatically scrolls (1, 2, 3, 4 or 5 lines) at a time.

Next, the user can select the "Skip Ads" mode, which was discussed earlier herein. The user can select whether the controller 125 should scroll past ads automatically. In the example provided in FIG. 5, the user has turned off "Skip Ads" mode (by sliding the Skip Advertisements on/off button 240 to the right), so the controller 125 will not automatically scroll past ads.

Also, the user can select whether full page scrolling should be on or off by sliding the on/off button 250 left or right. If activated, once the user has read a page of content/text or one page worth of content that is displayed on the screen, the controller will scroll the next page of content or text to be displayed to the user. The controller may scroll one full page, or turn the page, or jump to the next page. In the example shown in FIG. 5, the user has selected that the full-page scrolling is off.

Next, the user can adjust the scroll speed of the controller, that is, how far the controller scrolls each line by selecting a level 260 displayed on the GUI 200. In the example shown in FIG. 5, the user has selected that the controller should scroll at a level of 2, where the spectrum of levels goes from level 1 to level 5. Level 1 means less distance, and level 5 refers to more distance.

Finally, still referring to FIG. 5, the user can select whether low light mode should be on or off by sliding the on/off button 270 left or right. When the low light mode is on, and the controller detects that the device is in a lowlight environment, the controller will brighten the display screen of the computing device to improve eye tracking accuracy. The controller may also lower the eye tracking tolerance to compensate for lower light eye tracking accuracy or a lower gaze accuracy in a lowlight setting. In the example provided in FIG. 5, the user has turned on the low light mode.

In some embodiments, the controller can automatically scroll digital content as the user is reading or viewing it or once the user has read or viewed it. The controller can further determine if automatic scrolling is accurate based on the manual scroll inputs of the user and can adjust accordingly. The controller may also automatically scroll digital content by mimicking the manual scroll behavior of the user, and it can detect whether the user is reading text on a digital device. The controller can automatically scroll when the user is actively reading and adjust the scroll distance based on where the user's eye(s) is currently gazing on the display screen. The controller is configured to stop scrolling if it detects that the user is not reading or viewing content on the display area. In further embodiments, the controller scrolls each line in a way that feels smooth and continuous to the user even when multiple lines are scrolled at once. The controller may also keep track of where text and images are in relation to the user gaze or where text and images are in relation to the display screen.

In another embodiment, the user can select a "skim" mode through the settings menu of the controller. In the "skim" mode, the controller scrolls faster and highlights important words. The highlighted important words can be highlighted with color or bolded. The highlighted important words may be only in the headers of text, rather than in the body of the text.

In some embodiments, an example controller can automatically scroll digital content as a person is reading or viewing the content (at the same rate which the person is reading or viewing) without the user having to touch the screen/without the user having to direct the computer to do so.

In one embodiment, an example controller can predict when to scroll a display based on certain eye movements or gestures, based on eye gaze tracking. In some instances, the example controller can automatically scroll digital content once the user has read or viewed such digital content.

An example controller can automatically scroll digital content by mimicking a manual scroll behavior of the user. The controller can detect when a user is reading text on a digital display and/or when a user is not reading text on a digital display. An example controller can detect when the user has read a line of text, by tracking one or both eyes of the user as they scan from left to right or left or left to right, while looking at display (or up and down in the case of vertical writing). The actual direction of reading or viewing is not limiting to this disclosure.

An example controller can automatically scroll a line of text once the user has read a line of text and/or reveal an additional line of text once the user has read a line of text. In some embodiments, an example controller can detect when a user is reading and can automatically scroll an equivalent distance to the number of lines read.

In some embodiments, a controller can determine when a user is not reading and can stop scrolling or not scroll, as well as automatically scroll when the user is actively reading and adjust the scroll speed or distance (number of pixels) based on what part of the display (y axis) the user is reading, such as when a user is actively reading below a certain point on the display the controller can increase the scroll speed or distance until the eye gaze is back to the desired location. Conversely, if the controller detects that the user is reading above a certain point on the display (top quarter) then the controller can automatically decrease or slow down (or even stop) the scroll distance/speed until the eye gaze is in the desired location.

Another example embodiment can learn the scroll behavior of a user and incorporate this behavior into the automatic scroll process, such as when a user is behaviorally known to reads five lines of text before scrolling, the automatic scroll process could mimic this behavior (or) if a user typically reads a whole paragraph then scrolls. Thus, the controller can be adapted to learn a user's reading behaviors and control automatic UI scrolling in response.

In one embodiment, a controller as disclosed herein can adjust the automatic scroll distance and/or scroll behavior based on page content. For example, when a user is reading while the controller is automatically scrolling and the user gets to the end of a paragraph and starts a new paragraph, the controller may scroll one additional line to account for the paragraph space. In some embodiments, the controller can also adjust scroll distance/speed based on font size, pictures, and/or line spacing—just to name a few.

Some embodiments include a controller that allows a user to read or view content on a digital display without the user having to manually scroll to reveal additional content, or allows the user to manually adjust how the screen automatically scrolls any number of lines at a time.

In some embodiments, the controller is configured to combine together individual line scrolls to give a continuous smooth scrolling experience, as well as determine when there is an image on the screen and detect when the user is viewing the image. If the user is viewing an image on the display, the controller can stop scrolling or bring the image into full view if only a partial image is being displayed, or scroll until the image is in the middle or top of the display.

The controller can track where text and images are on the UI in relation to the user gaze. Once the user has read one full page, scrolled one full page, or turned the page (with paginated content), the controller can determine if automatic scrolling is accurate based on manual scroll inputs of user and can adjust accordingly.

In some embodiments, the controller can automatically scroll a digital device a distance that is equivalent to the content that has been read or viewed. The user can select a "skim" mode which highlights important words and allows the user to read faster.

In some embodiments, the controller can detect when a user has read a line of text on a digital display and can automatically scroll the equivalent distance of the line of text read, the controller can increase the scroll distance or speed when the user is reading or viewing the bottom of the screen. The controller can decrease the scroll distance or speed when the user is reading or viewing the top portion of the screen, the controller can adjust the scroll distances based on the content that is being displayed on the screen.

In some embodiments, the controller can be automatically enabled when a user is viewing compatible content, such as longform text, articles, documents, webpages, email, news, books, multi-page feed, and so forth.

The controller can be configured to detect and control a display using eye gestures. An example implementation includes a touchless user interface (or touchless human computer interface) that uses human eye gestures and movements to command the computer. An example controller can control device inputs based on specific eye gestures, gaze location and the content layout displayed on the screen.

In some embodiments, these eye gestures can mimic the pattern of touch gestures. The controller can detect when a user has read all of the lines on the display and can skip/scroll to the next page. In another implementation, the controller can detect when user is focused on the next page (zone) or button and can automatically move to the next page or move right. In another implementation, the controller can skip to the next page or move right when controller detects a swipe left eye gesture.

In another implementation, the controller can return to a previous page when controller detects the previous page/scroll right eye gesture. In another implementation, the controller can detect when a user is reading or has read a line and can automatically scroll the device. In yet another implementation, the controller can detect if the eye gaze is focused on a control zone for a certain period of time then will perform that control zone's action (scroll down/scroll up/next page/last page/back button).

In one implementation, the controller can detect if eye gaze is focused on a control button for a certain period of time then will cause execution of that control button's action (scroll down/scroll up/next page/last page/back button).

In one embodiment, the controller can detect an eye gesture that mimic touch gestures. For example, users can select which eye gesture corresponds with certain action or input and can also be controlled by voice or touch inputs, or any other operating system level controls.

The controller can detect if the user rereads a particular word or sentence more than once to determine comprehension and/or reading ability, or misunderstanding of work or sentence. When the y coordinate location changes from previous line read, then scrolling can continue. In some embodiments, the reading of a line may be considered a left to right gesture or left to right to left gesture.

Some example controllers can detect and track whether or not a user actually read a given word, sentence, paragraph, page, or document, in the case of signing a contract or agreement or a reading assignment.

Figure 6:
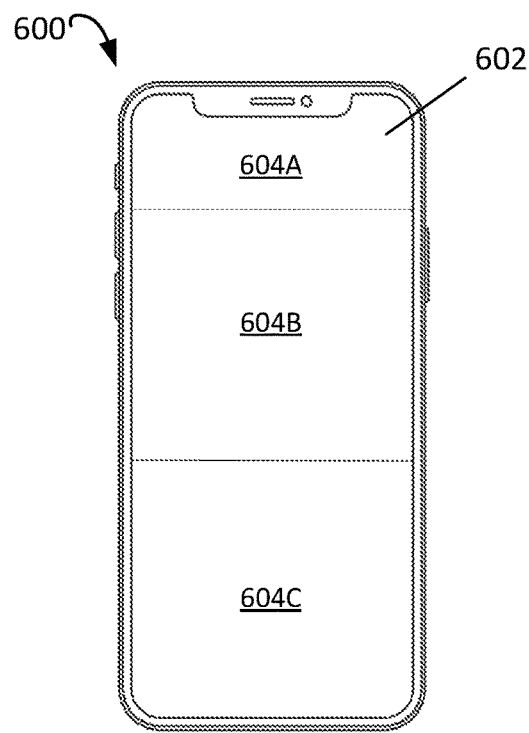
FIGS. 6-10 each illustrate the segmentation or zoning of a display screen in accordance with the present disclosure.

Referring now to FIG. 6, which illustrates an example mobile device 600 with a display 602 that is segmented into a plurality of zones 604A-604C. In general, a controller as disclosed herein can detect a gaze location of an eye of a user. The controller can determine which of the zones 604A-604C the eye gaze location is directed towards. Next, the controller can determine if the user is reading, for example, by detecting back and forth and downward eye movement. The controller can also determine which section of the display the user is reading from (e.g., a target reading area). In response, the controller can enact or cause automatic scrolling based on parameters. For example, if the user is reading in zone 604A, the controller may not scroll or may stop scrolling when a scrolling action is occurring. When the user is reading in zone 604B, the controller may scroll one line at a time (or in response to each line the user reads). When the user is reading in zone 604C, the controller may scroll two lines at a time. Again, these selections are arbitrary and can be adjusted per user behaviors or stated preferences.

Figure 7:
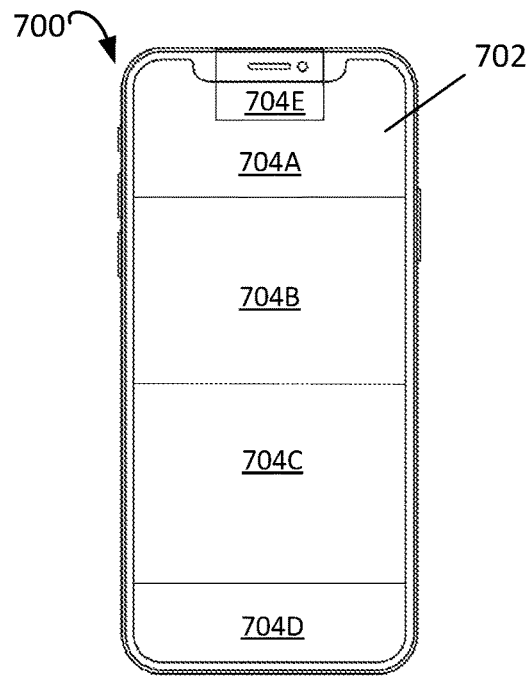

FIG. 7 illustrates an example mobile device 700 with a display 702 that is segmented into a plurality of zones 704A-704E. A controller responds to eye gaze in zones 704A-704C similarly to that which is stated above with respect to zones 604A-604C of FIG. 6. When the user's gaze is in zone 704D for a period of time, a controller may upwardly scroll the content displayed on the device until user's gaze is no longer detected in this section (or scroll predetermined number of lines similar to touch gesture scroll). It will be understood that the controller can use the same logic to provide a next page in the case of paginated content. Also, if an image is being partially displayed in 704D and gaze is detected the controller can scroll until the full image is in view, or until image is centered on the display.

When controller detects the user's gaze in zone 704E for a period of time, the controller can cause content to be scrolled down until the user's gaze no longer detected in zone 704E (or scroll predetermined number of lines similar to touch gesture scroll). It will be understood that the size and shape of each zone can vary and be adjusted (e.g., zone 704E could stretch across the entire display, or zone 704D could be a box in the center of the display, similar to zone 704E.

Figure 8:
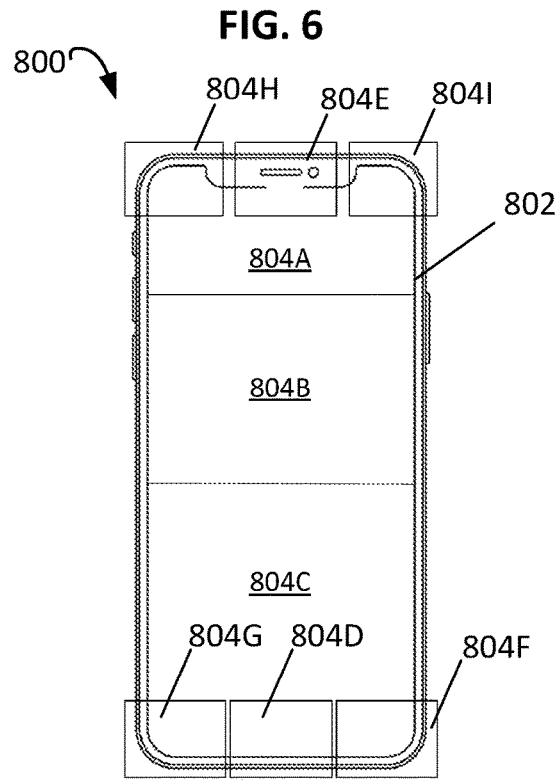

FIG. 8 illustrates an example mobile device 800 with a display 802 that is segmented into a plurality of zones 804A-804I. A controller responds to eye gaze in zones 804A-804C similarly to that which is stated above with respect to zones 604A-604C of FIG. 6.

When gaze is detected in zone 804D, the controller can scroll up until gaze is no longer detected in 804D (or scroll predetermined number of lines similar to touch gesture scroll). This can also include a full-page scroll in some embodiments. If a partial image is displayed in 804D and gaze is detected, controller can scroll until full view of image is displayed, or until an image is displayed in the center or top of screen.

When gaze is detected in zone 804E, the controller can scroll down/back until gaze no longer detected in 804E (or scroll predetermined number of lines similar to touch gesture scroll). This can also include a full-page scroll or scroll all the way back to the top of screen (similar to the touch gesture of tapping on the top of a mobile device screen). When gaze is detected in zone 804F, the controller can display the next page (paginated text) or next screen. When gaze is detected in zone 804G, the controller can present a previous page (paginated text) or previous screen. When gaze is detected in zone 804H, the controller can display a previous chapter/article/screen/home or menu button. When gaze is detected in zone 804I, the controller can activate a home button/menu button/settings, or the like.

It will be understood that zone controls can be interchanged or omitted, can also adapt to existing UI's/navigation bars. Zones 804D-804I could display buttons or indicators for their specific functionality. If gaze is detected in a particular zone, controller could highlight the zone where gaze is detected or show indicator of impending action for that zone. A controller can show a cursor indicator of where eye gaze is being detected, this can also be hidden. The controller can also detect when and where a clickable link, button or window is displayed and if gaze is focused on that position, link or button can be selected/clicked (the controller can also indicate to the user prior to clicking that impending action is about to occur). If a video is displayed on the screen and gaze is focused on the video for a certain period of time, video can automatically start playing and/or stop playing when gaze is not detected on the video.

Figure 9:
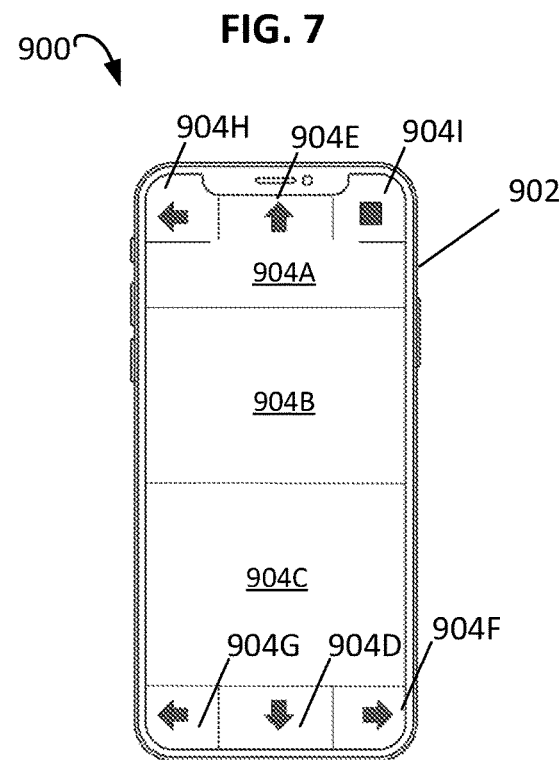

FIG. 9 illustrates an example mobile device 900 with a display 902 that is segmented into a plurality of zones 904A-904I. A controller responds to eye gaze in zones 904A-904C similarly to that which is stated above with respect to zones 604A-604C of FIG. 6. When a controller detects a gaze in zone 904D, the controller can scroll up until gaze is no longer detected in 904D (or scroll predetermined number of lines similar to touch gesture scroll). When a controller detects a gaze in zone 904E, the controller can scroll down until gaze no longer detected in zone 904E (or scroll predetermined number of lines similar to touch gesture scroll). This can also include a full page scroll or scroll all the way back to the top of screen (similar to the touch gesture of tapping on the top of a mobile device screen).

When a controller detects a gaze in zone 904F, the controller can display a next page (paginated text) or next screen. When a controller detects a gaze in zone 904G, the controller can present a previous chapter/previous article/previous page/go back button.

When a controller detects a gaze in zone 904H, the controller can present a previous chapter/previous article/previous page/go back button. When a controller detects a gaze in zone 904I, the controller can present a home button/menu button/settings for selection. Zone controls can be interchangeable or omitted, can also adapt to existing user interfaces or navigation controls. Zones 904D-904I could be visible to user at all times, or only sometimes, or only when gaze is detected on one of these zones. If gaze is detected in a particular zone, the controller could highlight the zone where gaze is detected or show indicator of impending action for that zone.

Figure 10:
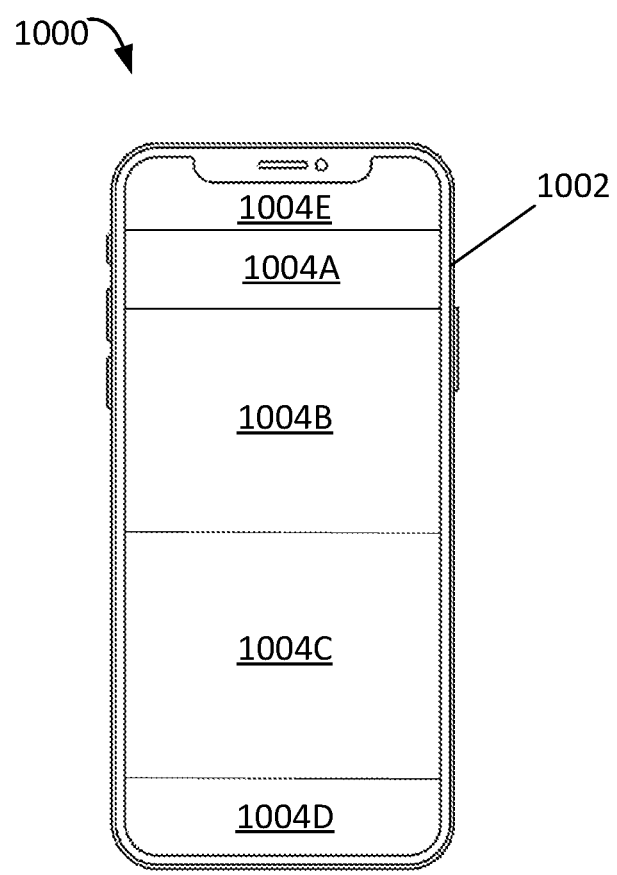

FIG. 10 illustrates an example mobile device 1000 with a display 1002 that is segmented into a plurality of zones 1004A-1004E. A controller responds to eye gaze in zones 1004A-1004C similarly to that which is stated above with respect to zones 604A-604C of FIG. 6.

When a controller detects an eye gesture (scroll down, swipe left swipe right) in zone 1004D, the controller can perform an associated input. When a controller detects an eye gesture (scroll up swipe left swipe right) in zone 1004D, the controller can perform an associated input. Reading, tap and zoom gestures can be detected anywhere on the display by the controller. The controller can detect when and where a clickable link, button or window is displayed and if gaze is focused on that position, link or button can be selected/ clicked (system can also indicate to the user prior to clicking, that impending action is about to occur).

If a video window is displayed on the screen, if gaze is focused on the video for a certain period of time, video can automatically start playing, stop playing when gaze is not detected on the video. The size and shape of each zone can vary and be adjusted. In a different configuration, eye gestures could be detected anywhere on the display and not just in designated zones.

Figure 11:
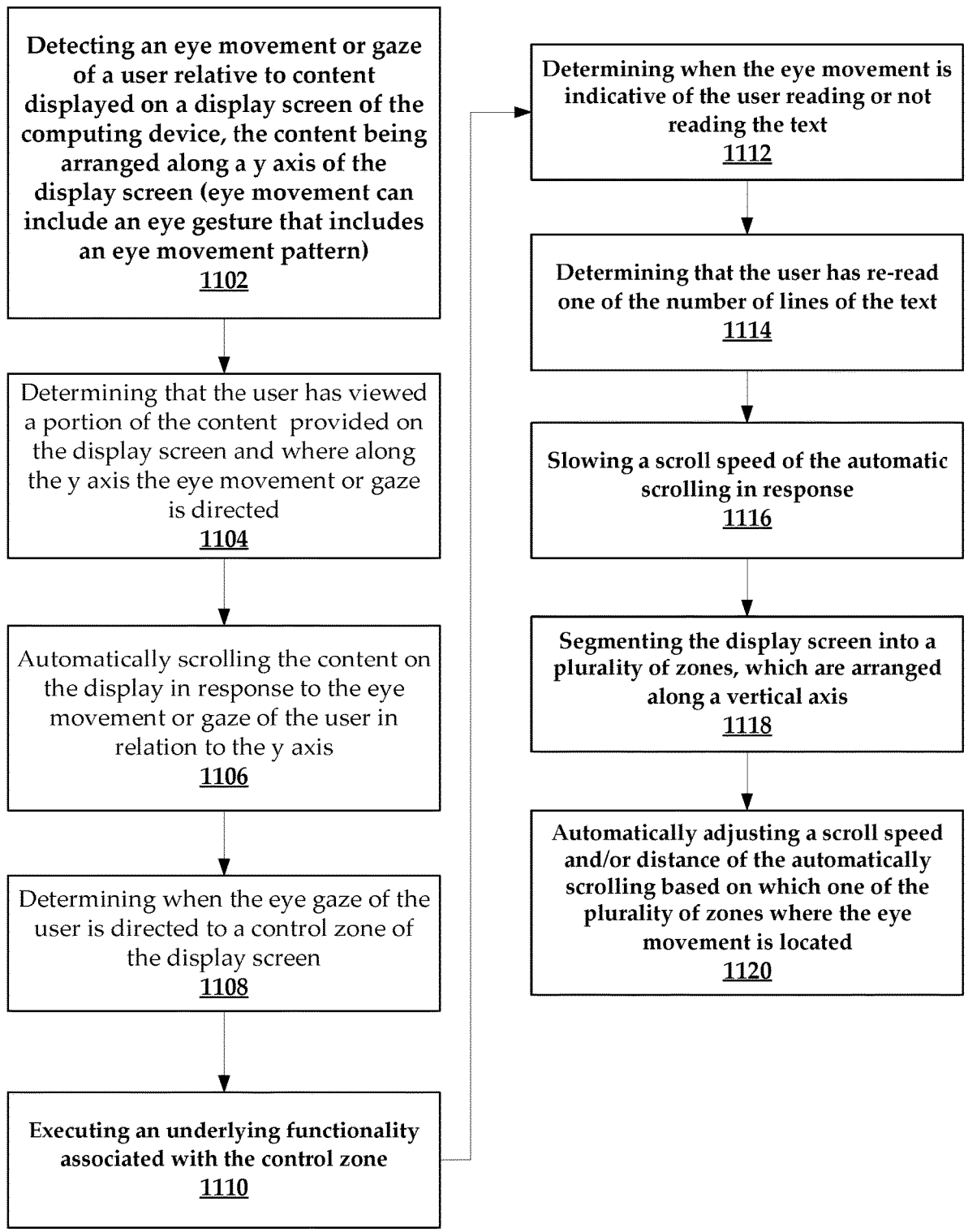
FIG. 11 is a flowchart of an example method of the present disclosure.

FIG. 11 is a flowchart of an example method. The method can include a step 1102 of detecting, via an eye tracking device of a computing device, an eye movement of a user relative to content displayed on a display screen of the computing device. It will be understood that the eye movement can include an eye gesture that includes an eye movement pattern. Various eye gestures are disclosed supra.

The method also includes a step 1104 of determining that the user has viewed a portion of the content in a target reading or viewing area of the display screen, along with a step 1106 of automatically scrolling the content displayed in the target reading area.

In some embodiments, the method can include a step 1108 of determining when the eye gaze of the user is directed to a control zone of the display screen, as well as a step 1110 of executing an underlying functionality associated with the control zone.

According to some embodiments, when the content includes text, the method further includes a step 1112 of determining when the eye movement is indicative of the user reading or not reading the text. In some embodiments, automatically scrolling comprises scrolling a number of lines of the text based on a reading speed of the user determined from the eye movement. In some instances, this can be based on the number of lines of text the user has read as well as the location on the display in which the lines were read.

In various embodiments, the method can include a step 1114 of determining that the user has re-read one of the number of lines of the text, along with a step 1116 of slowing/stopping a scroll speed of the automatic scrolling in response.

In one embodiment, the method includes a step 1118 of segmenting the display screen into a plurality of zones, which are arranged along a vertical axis, and a step 1120 of automatically adjusting a scroll speed and/or distance of the automatically scrolling based on which one of the plurality of zones where the eye movement is located.

In some embodiments, the method can include automatically adjusting the scroll speed and/or distance until the eye movement has adjusted to another one of the plurality of zones. Some embodiments include determining a reading speed for the user and adjusting the scroll speed of the automatically scrolling based on the reading speed, the reading speed being based on the eye movement. The method can also include adjusting the automatic scrolling based on manual scrolling by the user.

Figure 12:
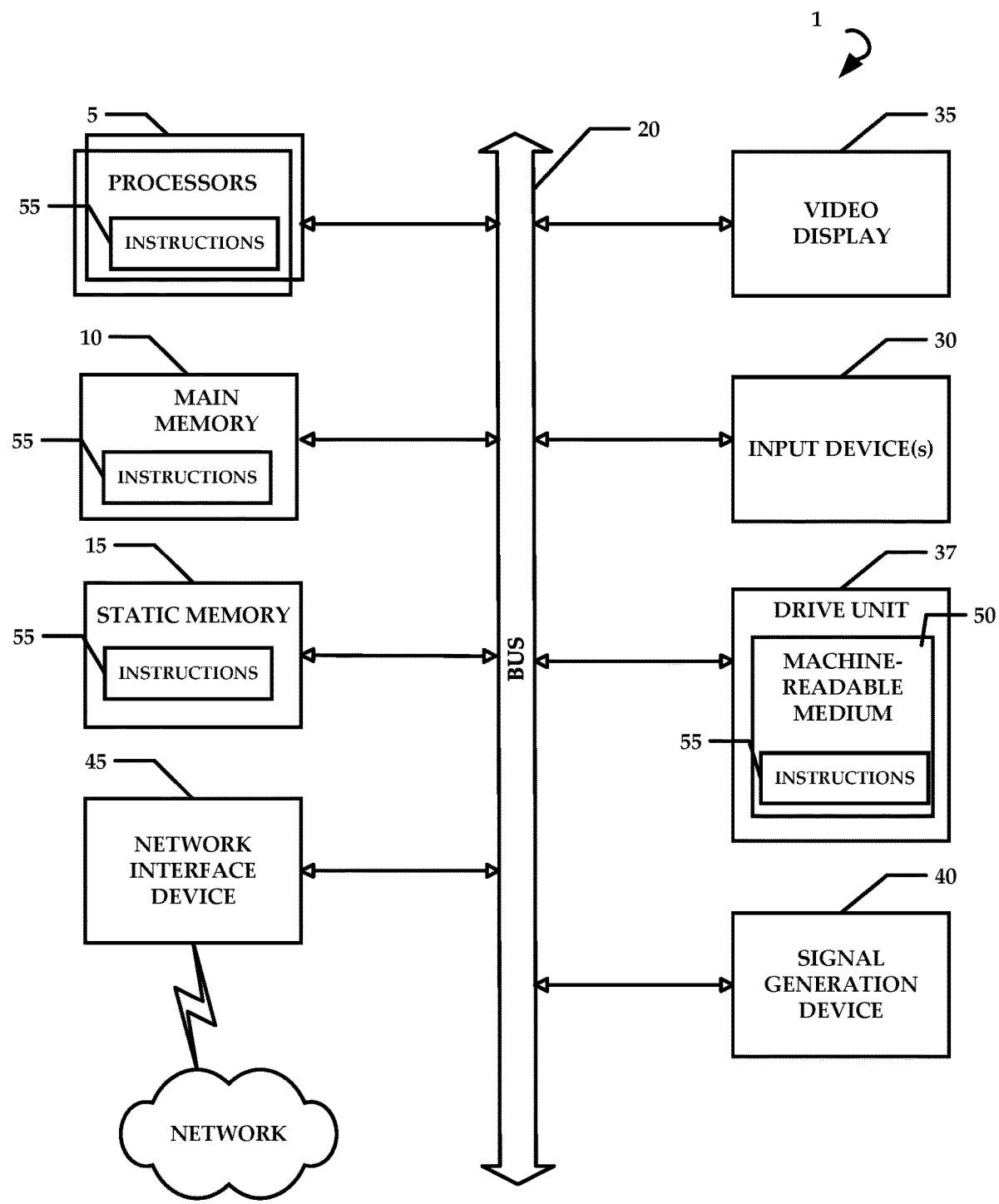
FIG. 12 is a simplified block diagram of a computing system, in accordance with some embodiments.

FIG. 12 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, heads-up display, wearable device, VR/AR glasses or goggles, hologram, digital billboard, watch, e-reader, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for the purpose of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer programs products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

Reading Detection

Figure 13:
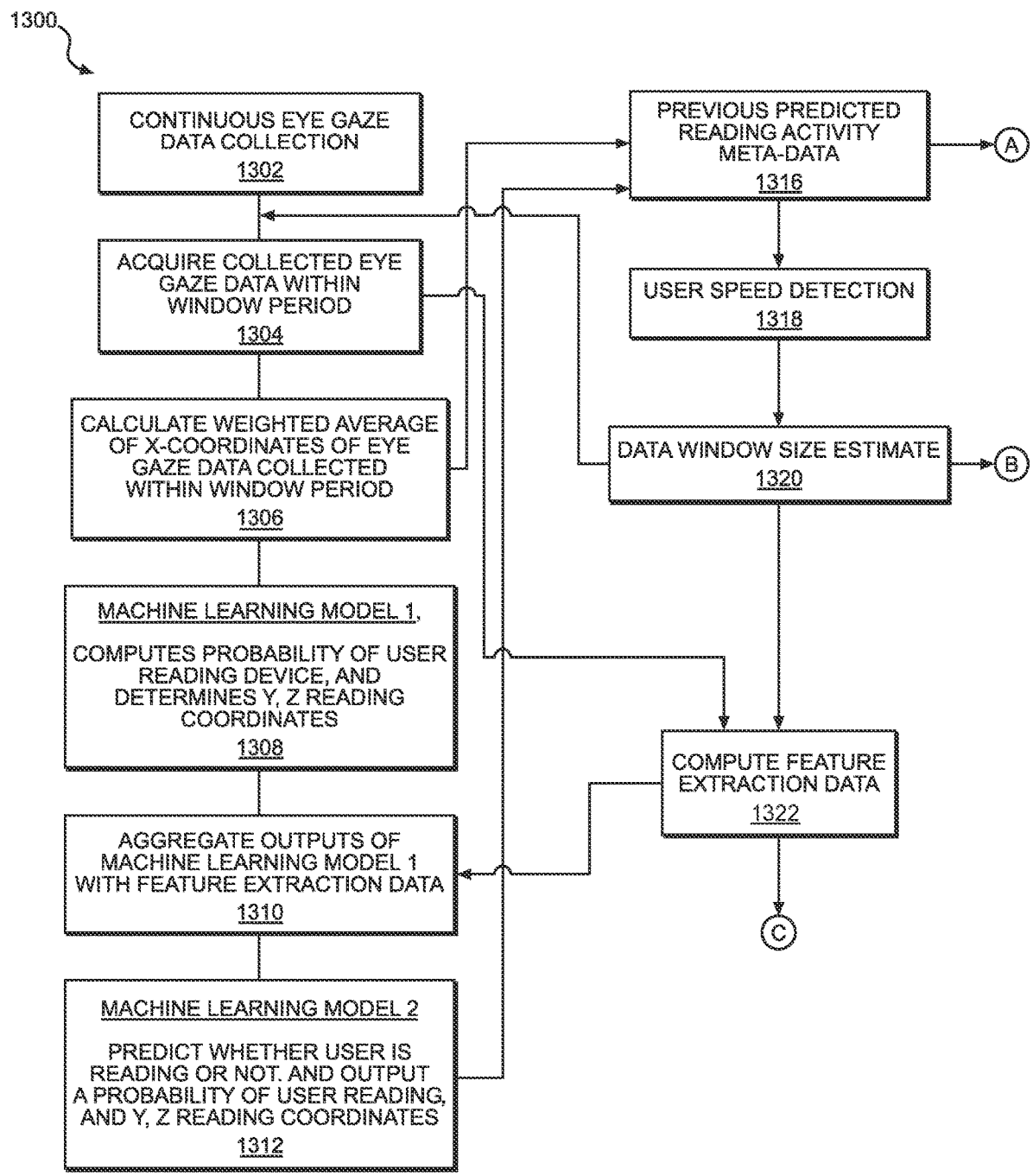
FIG. 13 is a flowchart of an example method of detecting a user's reading activity of content displayed on a display screen of a computing device.

FIG. 13 is a flowchart 1300 of an example method of detecting a user's reading activity of content displayed on a display screen of a computing device. These steps may be performed by one or more general purpose processors of a mobile computing device or instead by one or more dedicated processors specifically suited to the functionality described herein.

The method can include a step 1302 of detecting and sampling, via an eye tracking device of a computing device, eye gaze data comprising a time series of data points of an eye movement of a user relative to content displayed on a display screen of the computing device. Each sampled data point in the time series comprises an X, Y, Z coordinate and optionally one or more sampled face projection points projected from the face of the reader. In an embodiment, up to 60 face projection points may be sampled in a single sampling interval. In some embodiments, less than 60 face projection points may be sampled at each sampling interval. In an embodiment, only the center of the face may be sampled by projecting only the center points to the device screen. In some embodiments, the actual number of facial points sampled may vary depending upon the implementation and may employ an unrestricted number of projection points. Face projection point are used to determine when a user is looking at the display screen and also to improve Y-learning, described with reference to FIG. 14.

In an embodiment, a device has 4 boundaries: left, right, up, and down, each boundary being represented by display coordinates. If the center of a face projected to the screen is determined to be outside of the 4 boundaries, then the user is not looking at the screen.

In an embodiment, the X and Y coordinates corresponding to points on a display screen of a reading device can be described relative to a (0,0) origin at the center of the screen. However, choosing a device center is arbitrary and may be chosen at the discretion of a system designer. Notably, the Z coordinate corresponds to a user's distance from the display screen of the reading device.

Face projection points are defined herein as various points on a human face (i.e., a 3D object) that are projected onto a 2D image plane (i.e., a display device). The face projection points are points of interest on a face that may be collectively used to determine whether a user is looking at the display screen at any point in time. The face projection points can be any point on a face but typically include facial landmarks like the corners of the eyes, nose tip, and mouth corners. In one implementation, each sampled data point includes a single X, Y, Z coordinate and a single face projection point in the interest of processing speed and efficiency. As described above, other implementations may use more than a single face projection point. In other implementations, the number of face projection points may vary substantially in the range of 30-60 facial projection points. In an implementation that uses a relatively smaller number of face projection points, e.g., 30 points, the corners of the eyes are preferably chosen as the most desirable face projection points for determining whether a user is looking at a display screen.

In one implementation, an eye gaze data point is sampled approximately every 16 milliseconds corresponding to a 60 Hz refresh rate and is made up two components, an X, Y and Z coordinate value corresponding to a user's current eye position projected on a display screen at some point in time and 60 face projection points corresponding to the position of different facial landmarks on the user's face at that same point in time.

In an embodiment in which 60 face projection points are sampled, each sampled eye gaze data point has the following form:

data point=(X, Y, Z, fpp1, fpp2, . . . fpp60, timestamp)

Other embodiments may include more or less or face projection points.

The method also includes a step 1304 of collecting the sampled eye gaze data points into time windows having an associated window size. Where the window size may be dynamically determined in real time in accordance with a data window size determination process, discussed below with reference to FIG. 15.

In operation, a window size will be dynamically selected for each window period at the termination of processing of the previous window period. A window size selected for use in a particular window period is determined by a dynamic selection process in which a window size is selected from two or more window sizes of choice.

In a non-limiting example, during configuration, two or more window sizes are made available for selection at each window period. The window sizes made available for selection at each window period may include, for example, a first window size of 64 data points, a second window size of 96 data points and a third window size of 128 data points. During an operational stage, at the end of each window period, a window size is dynamically selected in real-time for the next window period. The selection is made only from among the various limited number of window sizes made available for selection as established during configuration.

A window period may be defined by its sampling interval and its window size. For example, for a window period on the order of 1 second, the window period would include 64 data samples, sampled at a data rate on the order of 16 milliseconds. Similarly, for a window period on the order of 1.6 seconds, the window period would include 96 data samples at a data sampling rate on the order of 16 milliseconds. And for a window period on the order of 2.1 seconds, the window period would include 128 data samples at a data sampling rate on the order of 16 milliseconds.

In some embodiments, the window size for selection at a window period can be any window size within the range of 32 data samples per window to 160 data samples per window. In one embodiment, the window period selected for use in each window period may be determined by translating the eye gaze data samples from the time domain to the frequency domain, as will be described more fully with respect to the flowchart of FIG. 15.

X-Coordinate Weighted Average

The method also includes a step 1306 of calculating the weighted average of only the X-coordinates from the sampled time series eye gaze data points for each window period. The weighted X coordinate is a required input to the Machine Learning Model (MLM) 1, described below.

Eye Gaze Data Preprocessing

Pre-processing of the time series sampled data can take many forms. Each of which are described as follows.

Data Interpolation

The time series eye gaze data may be sampled approximately every 16 milliseconds corresponding to a frame rate of 60 Hz. In an embodiment, the sampling rate is 16.67 milliseconds. The sampling rate is largely determined by a device's frame rate. It is well known, however, that frame rates can be different in different devices. If the frame rate of a device is determined to be other than 60 Hz, e.g., 30 Hz, an insufficient number of samples will be acquired to make an accurate prediction. To remedy this deficiency, a data interpolation procedure may be performed to construct data points at approximately every 16 milliseconds to correspond to the 60 Hz frame rate.

Averaging

According to another pre-processing method that may be performed on the time series eye gaze data, a currently sampled eye gaze data point may be averaged with the previously N sampled eye gaze data points to derive a single averaged eye gaze data point averaged over N+1 periods, where N is an integer.

Weighted Averaging

According to yet another pre-processing method that may be performed on the time series eye gaze data, both the X and Y coordinates of a single sampled eye gaze data point may be averaged in separate weighting schemes that operate on the same weighting principle. That is, the X and Y coordinates are weighted separately, but in accordance with the same weighting scheme. The weighting scheme operates by weighing a currently sampled eye gaze data point (e.g., X or Y) more strongly relative to the two most recent sampled eye gaze data points. For example, a currently sampled X coordinate eye gaze data point will be assigned an associated weight value of 3, and the two most recently sampled X coordinate data points will be assigned weight values of 2 and 1, respectively. In this manner, more emphasis is placed on the more recently received sampled data point by assigning it a higher relative weighting value of 3. The weighting values can vary depending upon the implementation with the only criteria being placing increased emphasis (i.e., highest weighting value) on the most recent data sample.

In some embodiments, a low pass filter may be used to remove noise and spikes from the sampled data points.

Machine Learning Model (MLM 1) Step

The method also includes a step 1308 of utilizing Machine Learning Model 1 (MLM 1) to derive first and second outputs, where the first and second outputs respectively comprise (1) an initial course probability of a user reading text on a device on a line-by-line basis and (2) the averaged Y and Z eye gaze coordinates of the read text. The initial course probability output may be susceptible to false positives based in part on the limited scope of inputs provided to MLM 1 to calculate the probability. These false positives are minimized or otherwise eliminated by Machine Learning Model (MLM) 2 which relies on the output of MLM 1 and further additional inputs in making a less course probability determination.

In one embodiment, MLM 1 computes an initial course probability of reading detection based on the weighted X coordinate values acquired as input to MLM 1 at the previous step 1306. In an embodiment, MLM 1 computes and outputs at each window period (1) an initial course probability of reading detection, which will be lower than a less course probability output by MLM 2 and (2) averaged Y and Z eye gaze coordinate values. The X coordinate and Y coordinate values are weighted average values whereby the weighting places more emphasis on the most recent sampled X and Y coordinate sample.

MLM 1 uses the weighted X coordinate values to construct a reading pattern of the user reading the device, as described below with reference to the exemplary reading patterns of FIGS. 17A, 17B, 17C, and 17D. Each reading pattern comprises a set of features, some of which are found to be in common with all other reading patterns. The method takes advantage of these established and accepted common features is shared commonality of certain features relies upon the common features of the reading patterns to determine if a user is reading text. That is, to determine if a current user is reading text, the features of the user's reading pattern that are common to other reading patterns are compared with the features of a number of pre-stored reading patterns that were obtained during a training stage of the MLM 1. A confidence score will be assigned to the reading pattern of the user based on the degree of feature commonality with features of the pre-stored reading patterns. In the case where it is determined that there is a statistically significant amount of features in common between the user reading pattern and the features of one of the pre-stored reading patterns, a confidence score will be assigned to the user reading pattern that indicates the degree to which the user is believed to be reading text.

FIGS. 17A, 17B, 17C, and 17D illustrate, by way of non-limiting example, various pre-stored reading patterns of other users acquired by the MLM 1 during the training stage. As explained above, the pre-stored reading patterns are used in pattern matching. FIGS. 17A, 17B, 17C, and 17D illustrate four exemplary user reading patterns for ease of explanation. It should be understood, however, that the number of pre-stored reading patterns can number in the thousands.

Figure 17A:
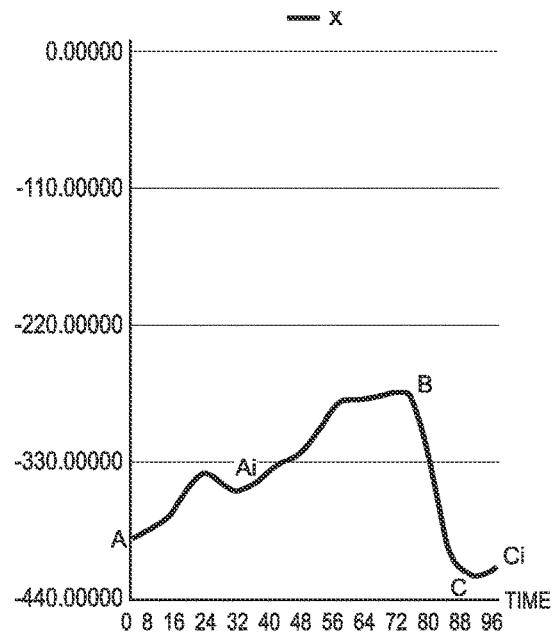
FIGS. 17A, 17B, 17C, and 17D illustrate various pre-stored reading patterns of other users acquired by the MLM 1 during a training stage.

With reference now to FIG. 17A, there is shown a first exemplary user reading pattern sample acquired by the MLM 1 during training. In FIG. 17A a reader reads a first line with a starting x-coordinate at point A. The user then reads towards the end of the first line at point B. Points Ai where I=1 to N represent intermediate coordinates in the reading process between points A and B. Once the user has reached the end of the first line at point B, the reader's eye gaze traces back to the beginning of the next line which is marked at point C to begin the next line reading cycle, marked as Ci, where i=1 to N.

Figure 17B:
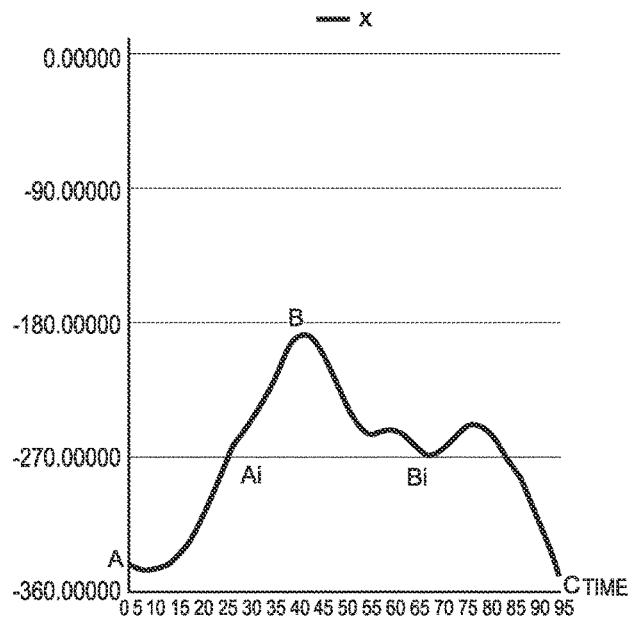

With reference now to FIG. 17B, there is shown a second exemplary reading pattern sample that may be acquired by the MLM 1 during training. In FIG. 17B a reader reads a first line with a starting x-coordinate at point A. The user then reads towards the end of the first line at point B. Points Ai where I=1 to N represent intermediate coordinates in the reading process between points A and B. Once the user has reached the end of the first line at point B, the reader's eye gaze traces back to the beginning of the next line which is marked at point C. In this case, in the middle of returning to the beginning of the next line, the reader pauses as indicated by the coordinate Bi. The reader eventually returns his or her eye gaze to the start of the next line at point C.

Figure 17C:
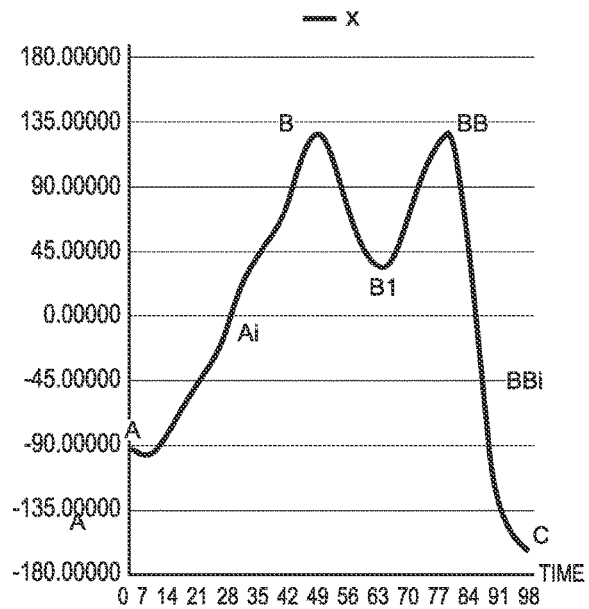

With reference now to FIG. 17C, there is shown a third exemplary reading pattern sample that may be acquired by the MLM 1 during training. In FIG. 17C a reader reads a first line with a starting x-coordinate at point A. The user then reads towards the end of the first line at point B. Points Ai where I=1 to N represent intermediate coordinates in the reading process between points A and B. Once the user has reached the end of the first line at point B, the reader's eye gaze traces back for a few short moments to point B1 without returning all of the way to the beginning of the next line. The reader then reads to the end of the line at point Bb. The reader finally returns to the beginning of the next line which is marked as point C through points BBi.

Figure 17D:
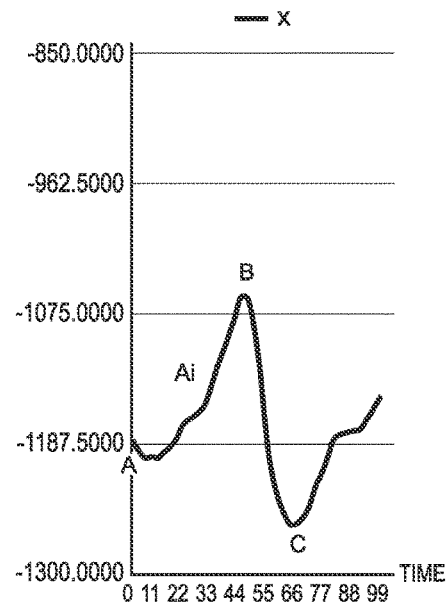

With reference now to FIG. 17D, there is shown a fourth exemplary reading pattern sample that may be acquired by the MLM 1 during training. In FIG. 17D a reader reads a line with starting X coordinate A. The reader reads only half of the line, stopping at point B. The reader then returns to the beginning of the next line at point C.

The method also includes a step 1310 of aggregating the MLM 1 output of step 1308 (outputs of MLM 1) with the output of step 1322 (computed feature extraction data). In another aspect, the feature extraction data is also used as an input to performing eye gesture prediction, described further below with reference to FIG. 16.

Machine Learning Model 2

The method also includes a step 1312 of utilizing a second Machine Learning Model 2 (MLM 2) that predicts with a higher confidence than MLM 1 whether a user is reading content. The inventors have learned through experimentation that MLM 1 on its own produced a high number of false positives. MLM 2 reduces the number of false positives generated by MLM 1 and also made reading detection adaptive to each individual user by virtue of its learning and training capabilities. Further, by utilizing a second machine learning model (i.e., MLM 2) the overall reading activity detection method of the present disclosure is more generic and therefore more widely applicable to a wider population. MLM 2 requires more inputs than MLM1, the additional inputs including statistical data inputs, area and signal strength, Delta X and Delta Y. These additional inputs are coupled with the output of MLM 1 to make a final decision regarding the prediction of a user reading activity. MLM 2 further eliminates false positives that occur in MLM 1, where the false positives are typically caused by a user browsing or skimming. The additional inputs provided to MLM 2 advantageously facilitate MLM 2 making prediction results with a significantly higher accuracy than MLM 1.

In addition to providing a prediction of detecting reading activity as output, MLM 2 also outputs the averaged Y and Z eye gaze coordinates each window period. MLM 2 is capable of outputting a prediction with a higher confidence value than MLM 1 in part because MLM 1 operates only on a single input (i.e., weighted X values) while MLM 2 operates on two inputs including the outputs of MLM 1 and the computed Feature Extraction data. In some embodiments, the Z eye gaze coordinates are not a required input by having some fixed value. For example, in an implementation using a headset, the Z value would be assigned a fixed value corresponding to the distance from the user's face to the headset display.

Figure 18:
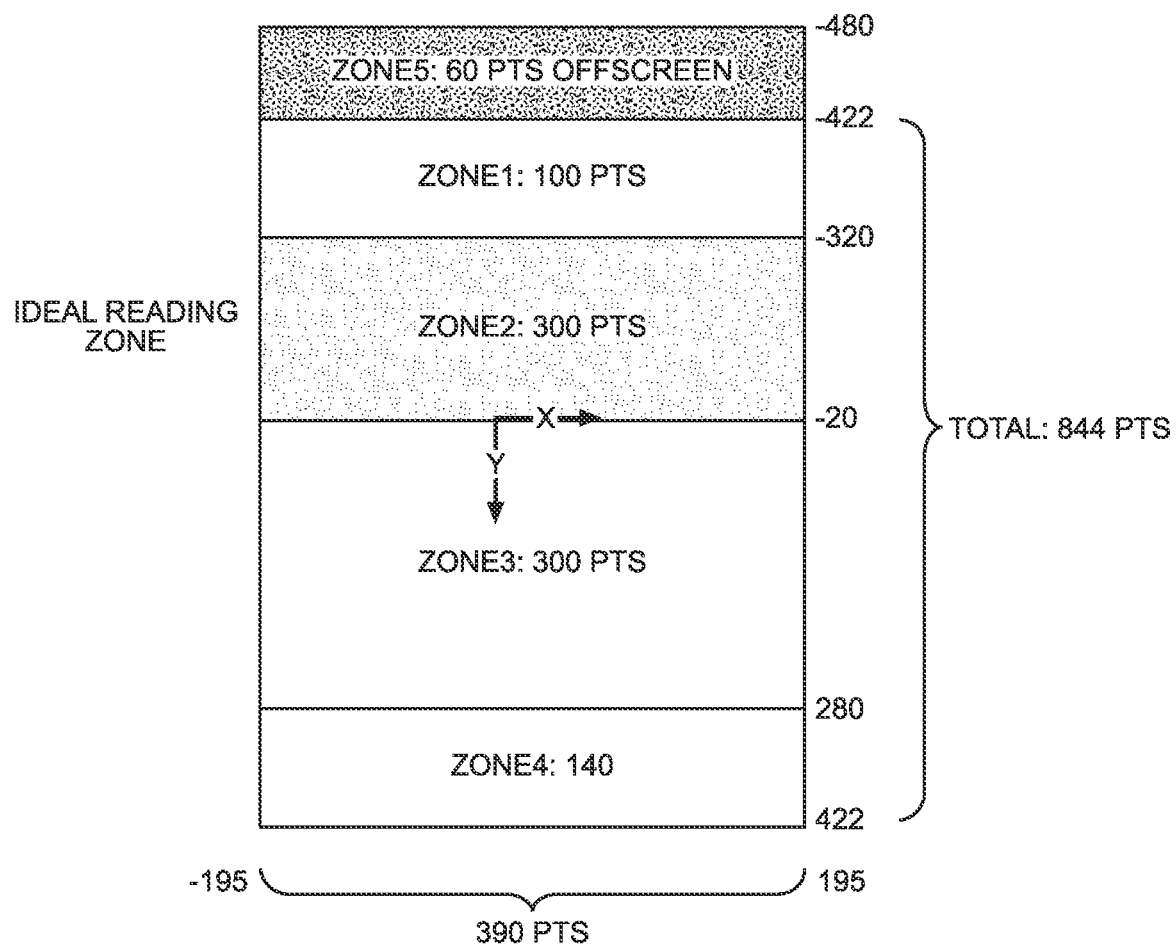
FIG. 18 illustrates the various reading zones of a display device including an ideal reading zone (IRZ).

The method also includes a step 1316 of receiving previous predicted reading activity Meta-data. At step 1316, the output of MLM 2 is received as a first input and the calculated weighted average of the X-coordinates is received as a second input. The two inputs are used to perform Y-learning which comprises a method for scrolling text on the display to an ideal reading zone, as shown in FIG. 18 and described further below. The two inputs are also used to obtain a data window size estimate at step 1320, described further below with reference to the flowchart of FIG. 14. The data window size estimate is provided as a first input at step 1304 to establish a window period within which the continuously generated gaze data will be collected. That is, as the eye gaze data is continuously received every 16 milliseconds, the data is organized for processing into successive windows having a particular window size as determined by the window size estimate. The method for calculating the data window size estimate is described below with reference to the flowchart of FIG. 15.

Y-Learning

Figure 14:
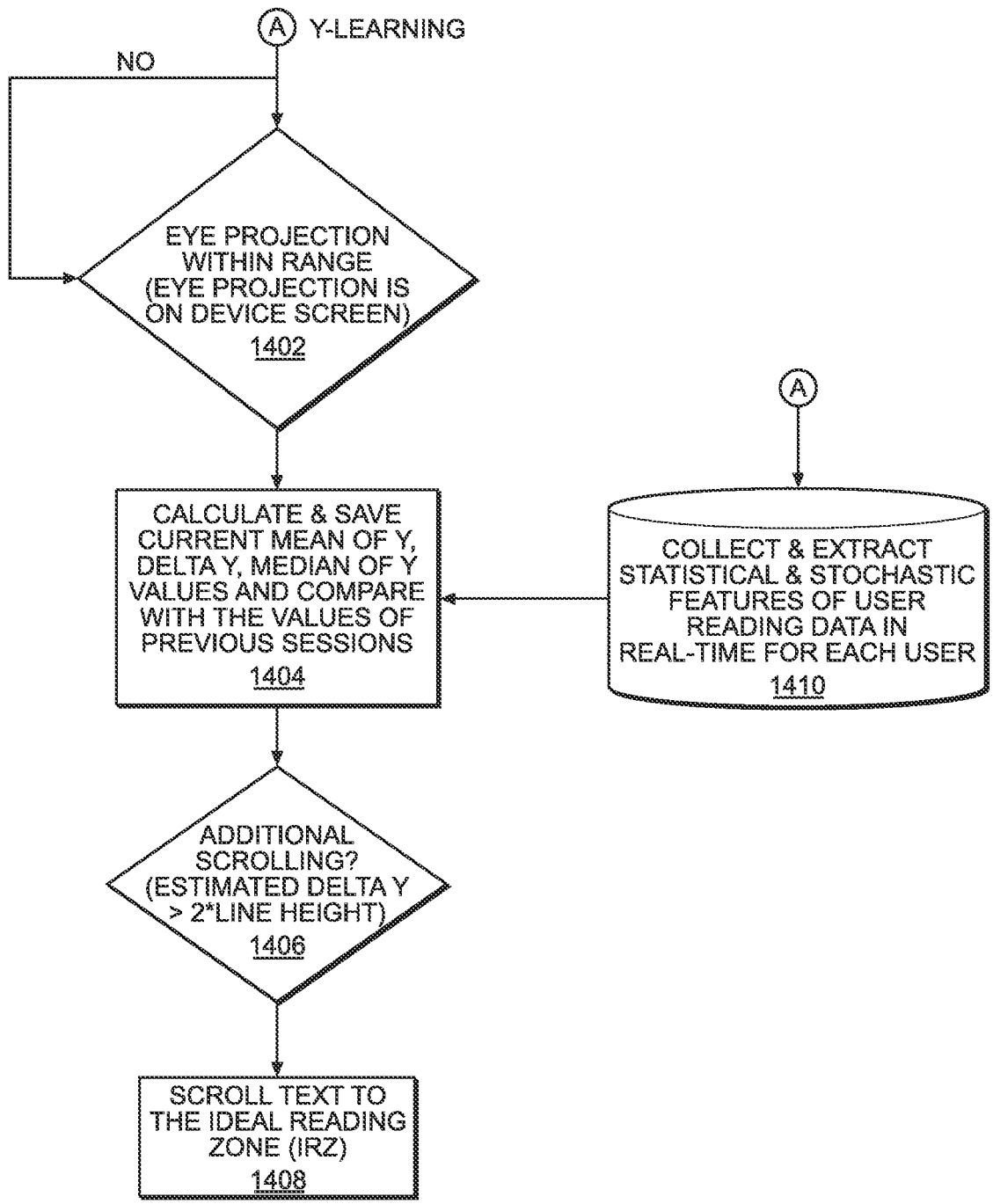
FIG. 14 is a flowchart of an example method of scrolling text on a device viewable by a user to an ideal reading zone (IRZ), the method referred to herein as Y-learning.

FIG. 14 is a flowchart of an example method of scrolling text on a device viewable by a user to an ideal reading zone (IRZ), the method referred to herein as Y-learning. These steps may be performed by one or more general purpose processors of a mobile computing device or instead by one or more dedicated processors specifically suited to the functionality described herein.

As shown in the flowchart of FIG. 14, a first input is received at determination step 1402 and a second input is received at step 1410 to perform Y-learning, each of the first and second inputs being sourced from step 1316 of FIG. 13 (reading activity detection). The first input, received at determination step 1402, comprises one or more face projection points, as described supra. The face projection points are points that are collected from various points on the face of the reader. This first input can comprise anywhere from 1 to 60 face projection points depending on the particular implementation.

At determination step 1402, based on the received face projection data points, a determination is made regarding whether the received face projection points provide evidence that the user is looking at the display. If it is determined that the user is not looking at the display at this step, the process continues to monitor the next set of face projection points input at future time intervals in accordance with the continuously received eye gaze data. Otherwise, if it is determined that the user is looking at the display, the process continues to step 1404.

At step 1404, having determined that the user is looking at the display at the previous step 1402, at this step, a number of calculations are performed including, calculating the current mean of the Y-coordinates, the current Delta Y, and the median value of the Y coordinates. Each of the calculations are compared with previous sessions, where a session is defined as a detected read-a-line event (i.e., a line of reading activity by the reader). In other words, a detected read-a-line event represents user reading activity in reading a single line of text.

The calculated Delta Y value represents the user's vertical viewing range of a sampled data source in a current window period. In other words, what was the vertical extent of the text viewed by the user in a current window period. Determining a Delta Y value is useful in the overarching real-time determination of whether or not additional scrolling of text is necessary to correct the user's viewing zone from, for example, zone 3 or zone 4 to zone 2 (the ideal viewing zone), as shown in FIG. 18. With continued reference to FIG. 14, there is shown at step 1404 a process of sampling and extracting statistical and stochastic features of the user reading data. The statistical and stochastic may include, in one implementation, the mean and variance of the sampled data. The extracting statistical and stochastic features of the user reading data are derived from the previously predicted reading activity meta-data, as shown in step 1316 of FIG. 13. It should be understood that while in the presently described embodiment, the Delta Y value is used to determine the need for additional scrolling, in other embodiments, a machine learning model could be trained to use the extracted statistical and stochastic features of the user reading data to make a decision regarding the need for additional scrolling.

At determination step 1406, it is determined that additional scrolling is needed to move the user's gaze back to the ideal reading zone (IRZ) (i.e., zone 2), as illustrated in FIG. 18. The determination is based on the estimated Delta Y being greater in magnitude than twice the current line height, computed as follows:

$$\text{Is Delta } Y > 2*\text{current line height.}$$

At step 1408, if it is determined at step 1406 that Delta Y is greater than twice the current line height, additional scrolling is applied to the user's display to move the user's eye position back to the ideal reading zone 2 (IRZ), as shown in FIG. 18.

Specifically, when Delta Y is determined to be greater than 2× Line Height, the screen content is scrolled automatically for an offset calculated as:

$$\text{Offset} = \text{Mean }(Y)\text{ of Current Reading} - \text{Mean }(Y)\text{ of Previous} - \text{Line Height.}$$

It is further determined to auto scroll one line height when the following inequality is satisfied:

[MeanY of Current Reading–the minimum Ymean of previous reading]>[mean of DeltaYs of previous reading]

By auto-scrolling more than a single line height, a user's gaze is brought back to an ideal reading zone (IRZ) with extra scrolling compensation.

At step 1410, the X, Y and Z coordinates sampled at each window period will be input from step 1316 of FIG. 13 to compute statistical and stochastic features of user reading data. The output of this step is supplied to step 1404, described above.

Data Window Size Estimation

Figure 15:
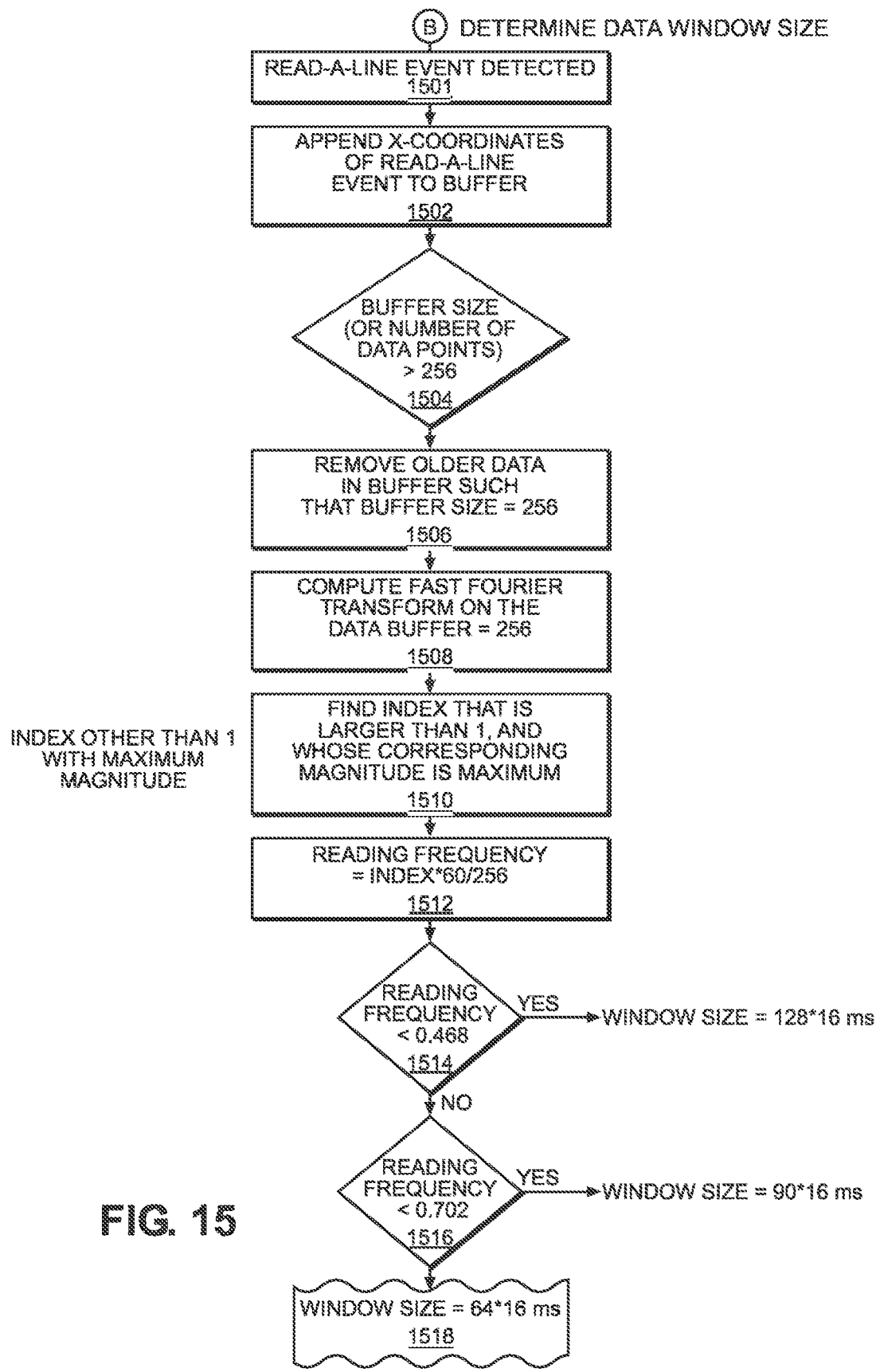
FIG. 15 is a flowchart of an example method of performing data window size estimation of an example method of the present disclosure.

FIG. 15 is a flowchart of an example method of performing data window size estimation. These steps may be performed by one or more general purpose processors of a mobile computing device or instead by one or more dedicated processors specifically suited to the functionality described herein.

FIG. 15 comprise the detailed steps corresponding to step 1320 of the flowchart of FIG. 13, entitled, "Data Window Size Estimate." These steps may be performed by one or more general purpose processors of a mobile computing device or instead by one or more dedicated processors specifically suited to the functionality described herein.

At step 1501, a read-a-line event is detected. The read-a-line event is a detection event corresponding to a user reading a single line of text on the display. The second machine learning model 2 (MLM 2) is trained to detect read-a-line events. MLM 2 requires two inputs to make a read-a-line event determination. A first input comprises the output of the first Machine Learning Model 1 (MLM 1) comprises (1) a probability that a user is reading text and (2) the X, Y, Z coordinates of the text being read by the user. MLM 1 takes as input, the X coordinates for a single line of text being viewed by the user. The outputs of MLM 1 are fed as a first input to MLM 2 which also receives a further input of certain feature data extracted from the continuously sampled eye gaze data (X, Y, Z). The feature data may include, for example, signal energy, range of X, Y and Z, standard deviation, an enclosed area defined by the X-Y coordinates within a particular data sampling window and an average of both the X and Y coordinates.

The signal energy can be computed as the sum of square of the value of the particular X or Y coordinate minus a minimum value then divided by 100 times number of data points. The calculation may be represented as:

$$Sum((x-x\ min)*(x-x\ min))/(100*n)$$

where—X refers to the X coordinate,
where—Xmin is the minimum X coordinate, and
where—n is number of data points, also referred to as the window size.

MLM 2 uses the feature data received from a number of different users to learn different user reading patterns and behaviors and develop a set of generic parameters that can be used to output confirmation of a user reading text with the highest confidence level (e.g., highest probability). Accordingly, MLM 2 provides as output the read-a-line event which confirms with a high probability that a user is in fact reading text.

At step 1502, the X coordinates output from MLM 2 as part of the read-a-line event are appended to a read-a-line event buffer that is sized to hold a maximum of 256 data points (e.g., X coordinates). Other embodiments may utilize buffer sizes other than 256, including, for example, buffer sizes dimensioned to be 64, 128 or 512.

At determination step 1504, a determination is made regarding whether the read-a-line event buffer storing the X coordinates from successive detection events will exceed the buffer capacity of 256.

At step 1506, if it is determined at step 1504 that the buffer capacity will be exceeded, the oldest X-coordinate data is removed from the buffer and replaced with the most recently received X-coordinate data.

At step 1508, the X coordinate data in the read-a-line event buffer is converted from the time domain to the frequency domain. In one embodiment, a Fast Fourier Transform is used to perform the transformation.

At step 1510, the Fourier Transform outputs a magnitude spectrum of the transformed X coordinate data in the buffer in the frequency domain. The transformed data is then analyzed to identify an index number in the frequency domain that is a maximum index number. Notably, the first index number is not considered to be a viable candidate for having a maximum index number.

At step 1512, a user reading frequency is calculated from the identified maximum index number using the following equation, which assumes a sample frequency of 60 Hz and a buffer size of 256. It should be understood that the sample frequency and buffer size are merely exemplary, provided as a non-limiting example. Other frequencies and sample sizes are within contemplation of the disclosure.

$$Reading\ frequency=(maximum\ index\ \#*60)/(256).$$

At determination step 1514, a determination is made regarding whether the calculated reading frequency is greater than 0.468. if YES, a first window size is selected for use to be on the order of about 2 seconds, calculated as follows:

$$First\ Window\ size=(128*16\ ms.)$$

At determination step 1516, if it is determined that the calculated reading frequency is not greater than 0.468, then a further determination is made regarding whether the reading frequency is greater than 0.702. if YES, a second window size is selected for use to be on the order of about 1 second, calculated as follows:

$$Second\ Window\ size=(96*16\ ms.)$$

At step 1518, if it is determined that the calculated reading frequency is not greater than 0.702, then the window size is selected for use to be on the order of about 0.5 seconds, calculated as, $$Window\ size=(64*16\ ms.)$$

In an implementation, a window size determination is made at the end of every read-a-line event.

In other implementations, window sizes can be further sub-divided to handle ultra-fast and extremely slow readings by using, for example, a 32 data point or 160 data point window size, respectively.

Eye Gesture Prediction

Figure 16:
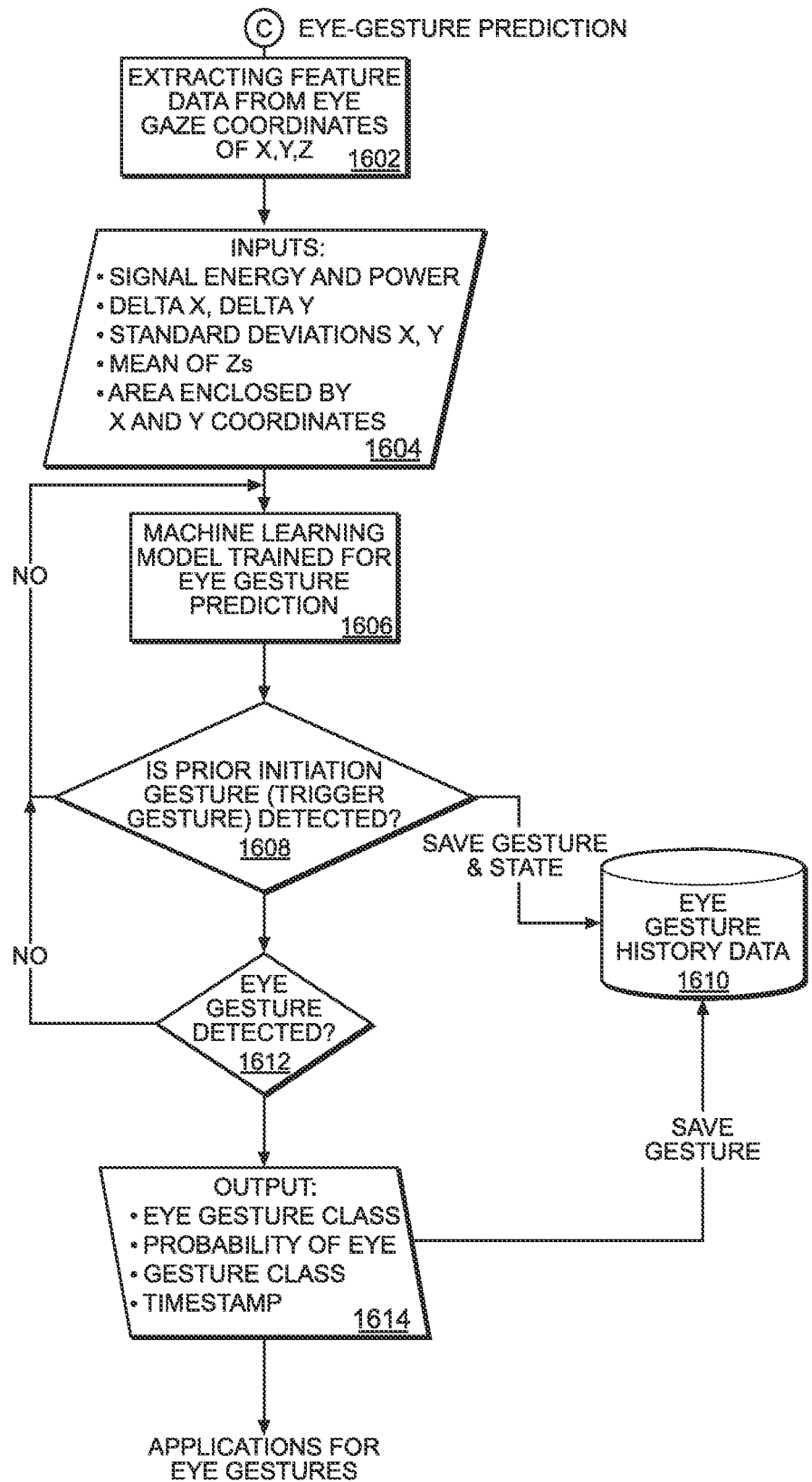
FIG. 16 is flowchart of an example method of performing eye gesture prediction.

FIG. 16 is a flowchart of an example method of performing eye gesture prediction. These steps may be performed by one or more general purpose processors of a mobile computing device or instead by one or more dedicated processors specifically suited to the functionality described herein.

At step 1602, feature data is extracted from the continuously sourced eye gaze data collected at step 1302 of FIG. 13 and collected into respective window periods at step 1304. The feature data comprises extracted features of the continuously sources eye gaze data including the sampled X, Y, and Z coordinates. Typical feature data that may be extracted from the continuously sourced data is defined at step 1604.

At step 1606, the first machine learning model (MLM 1) is trained at a pre-configuration stage for predicting the occurrence of eye gestures of a user in real time. Specifically, MLM 1 is trained on the features related to variations in the X coordinate eye-gesture patterns of different users as the as user reads a line of text from left to right.

At determination step 1608, the extracted feature data from step 1602 is continuously input to the MLM 1 in a time series fashion and organized in successive window periods. If the determination at this step results in a YES, the process branches in parallel to both steps 1610 and 1612.

It should be appreciated that at each window period a determination is made at this step regarding whether the user has initiated an Initiation gesture (i.e., trigger gesture) prior to an intended user gesture. Hence, the term is sometimes referred to as a prior initiation gesture. Using a prior initiation or trigger gesture ahead of an intended user gesture is important because it helps prevent misinterpretations by the device and enhances user experience. By initiating a specific prior initiation gesture before the intended user gesture, the device can accurately identify and anticipate the user's intent, reducing the likelihood of unintended outcomes, referred to as false positives. The trigger action of a prior initiation gesture as a clear indicator, providing context and reducing ambiguity for the device to process a subsequent intended user gesture.

At step 1610, upon detecting the prior initiation gesture at step 1608, the prior initiation gesture and its associated state are saved to a data repository, as shown in FIG. 16.

At determination step 1612, a determination is made regarding whether the user has made a user gesture subsequent to the user making a prior initiation (i.e., trigger) gesture. If YES, at step 1614, the eye gesture prediction algorithm outputs the (1) eye gesture class (e.g., left swipe, or right swipe, or swipe up, or swipe down), (2) a probability of the gesture belonging to the eye gesture class, (3) a timestamp. These outputs are forwarded to the data repository to determine from a gesture history of a user, if a previously designated prior initiation gesture has been performed by the user, determined to be similar to the current gesture being performed by the user. If it is determined that the current gesture matches a historical gesture of the user, the algorithm can infer the user's current intention (i.e., user eye gesture command). Otherwise, the current gesture may be disqualified as an eye gesture command. In one aspect, the method attempts to distinguish between eye gesture commands and random eye movements.

What is claimed is:

1. A method comprising:
    detecting, via an eye tracking device of a computing device, eye gaze data comprising a plurality of eye gaze data points of an eye movement of a user, the plurality of eye gaze data points comprising X, Y, and Z eye gaze coordinates;
    sampling the plurality of detected eye gaze data points at a prescribed sampling interval;
    collecting the sampled plurality of eye gaze data points into window periods having a prescribed window size;
    calculating, for the sampled plurality of eye gaze data points in each window period, a weighted average of the X eye gaze coordinates;
    determining, by a first machine learning model, for the sampled eye gaze data points in each window period:
       a) a first probability of determining a user reading activity in each window period based on the calculated weighted average of the X eye gaze coordinates of the sampled plurality of eye gaze data points in each window period;
       b) a reading location of weighted Y eye gaze coordinates; and
       c) optionally, a mean value of the Z eye gaze coordinates in each window period;
    calculating one or more feature extraction parameters from the sampled plurality of eye gaze data points sampled in each window period; and
    determining, by a second machine learning model, a second probability of determining the user reading activity in each window period, the second probability being calculated in accordance with the first probability and the weighted Y and the mean Z eye gaze coordinates output from the first machine learning model and the one or more feature extraction parameters.

2. The method according to claim 1, wherein the X, Y and Z eye gaze coordinates are eye gaze coordinates.

3. The method according to claim 1, wherein the second probability of determining the user reading activity in each window period is a relatively more accurate probability than the first probability of detecting the user reading activity.

4. The method according to claim 1, wherein the sampled plurality of eye gaze data points further comprise a plurality of face projection points corresponding to various positions on the user's face as the user is reading content.

5. The method according to claim 1, wherein collecting the sampled plurality of eye gaze data points into window periods having the prescribed window size further comprises determining the prescribed window size prior to collecting the sampled eye gaze data points at each window period, wherein a window period is an end of a read a line event.

6. The method according to claim 1, wherein calculating, for the sampled plurality of eye gaze data points in each window period, a weighted average of the X eye gaze coordinates further comprises weighing sampled data points received closer in time higher than sampled data points further away in time.

7. The method according to claim 1, wherein the prescribed sampling interval during which the eye gaze data is continuously sampled is in a range of substantially 16 milliseconds to 32 milliseconds.

8. The method according to claim 1, wherein the one or more plurality of feature extraction parameters comprise at least one of a signal energy in each window period, a range of delta X coordinate values in each window period, a range of delta Y coordinate values in each window period, an area enclosed by the X and Y coordinates in each window period, a mean value of the Z coordinates in each window period, a standard deviation of the X coordinate values in a window period, and a standard deviation of the Y coordinate values in the window period.

9. A method comprising:
    detecting, via an eye tracking device of a computing device, eye gaze data comprising a plurality of eye gaze data points of an eye movement of a user relative to content displayed on a display screen, the plurality of eye gaze data points comprising X, Y, and Z eye gaze coordinates;
    sampling the detected plurality of eye gaze data points at a prescribed sampling interval;
    collecting the sampled plurality of eye gaze data points into window periods having a prescribed window size, the plurality of eye gaze data points including a plurality of face projection points of a user's face projected onto the display screen of a display device;

determining if the user is viewing the display screen of the display device based on a positioning of the plurality of face projection points;

in the case where it is determined that the user is viewing the display screen:

calculating a current mean value of the Y coordinate in a window period;

calculating a delta Y value of the Y coordinate in the window period;

calculate a median of the Y coordinates in the window period;

determine if the delta Y value of the Y coordinate in the window period is greater than twice a line height of the content being viewed on the display screen; and in the case where it is determined that the delta Y value of the Y coordinate in the window period is greater than twice the line height of the content being viewed on the display screen, a screen text is automatically scrolled by an offset calculated as:

Offset=Mean (Y) of Current Reading−Mean (Y) of Previous−Line Height.

10. The method according to claim 9, wherein the display screen is segmented into a plurality of zones, which are arranged along a vertical axis and an ideal reading zone is located in an upper segment.

11. The method according to claim 9, wherein determining if the user is viewing the display screen of the display device based on the positioning of the plurality of face projection points further comprises: determining whether a central region of the user's face, as projected onto a 2D display, is determined to be outside the boundaries of the 2D display.

12. A method for predicting an eye gesture, comprising:

detecting, via an eye tracking device of a computing device, eye gaze data comprising a plurality of eye gaze data points of an eye movement of a user, the plurality of eye gaze data points comprising X, Y, and Z eye gaze coordinates;

sampling the detected plurality of eye gaze data points at a prescribed sampling interval;

collecting the sampled plurality of eye gaze data points into window periods having a prescribed window size, the plurality of eye gaze data points including a plurality of face projection points of the user's face viewing content on a display screen of a display device;

extracting feature data from the X, Y and Z eye gaze coordinates;

detecting, via a machine learning model, a trigger gesture made by the user; and in the case where a trigger gesture is detected:

storing the trigger gesture and state in a historical eye gesture data repository;

determining if a subsequent eye gesture is detected; and in the case where a subsequent eye gesture is detected:

outputting from the machine learning model, an eye gesture class, a probability of the eye gesture class being detected, and a timestamp; and storing the eye gesture in the historical eye gesture data repository.

13. The method according to claim 12, wherein the eye gesture class is one of a left swipe, a right swipe, a swipe up, and a swipe down.

14. A system comprising:

a display device;

an eye tracking device; and a controller comprising:

a memory; and a processor communicatively coupled to the memory the memory storing instructions executable by the processor to:

detect, via the eye tracking device of a computing device, eye gaze data comprising a plurality of eye gaze data points of an eye movement of a user relative to content displayed on a display screen of the display device, the plurality of eye gaze data points comprising X, Y, and Z eye gaze coordinates;

sample the plurality of detected eye gaze data points at a prescribed sampling interval;

collect the sampled plurality of eye gaze data points into window periods having a prescribed window size;

calculate, for the sampled plurality of eye gaze data points in each window period, a weighted average of the X eye gaze coordinates;

determine, by a first machine learning model, for the sampled plurality of eye gaze data points in each window period:

a) a first probability of the user reading a text on the display device based on the calculated weighted average of the X eye gaze coordinates of the sampled plurality of eye gaze data points; and b) a reading location of the Y and Z eye gaze coordinates;

calculate a plurality of feature extraction parameters from the sampled plurality of eye gaze data points collected at each window period; and determine, by a second machine learning model, a second probability of the user reading the text on the display device in each window period based on the first probability of the user reading the text on the display device, the reading location of the Y and Z eye gaze coordinates and the calculated plurality of feature extraction parameters.

15. The system according to claim 14, wherein the second probability provides a relatively higher probability than the first probability for detecting a reading activity.

16. The system according to claim 14, wherein the sampled plurality of eye gaze data points further comprises one or more face projection points corresponding to positions on the user's face.

17. The system according to claim 14, wherein the controller is further configured to determine a window size at each window period.

18. The system according to claim 14, wherein the controller is configured to calculate a weighted average of the X eye gaze coordinates of the sampled plurality of eye gaze data points in each window period by weighing sampled data points received closer in time higher than sampled data points received further away in time.

19. The system according to claim 14, wherein the prescribed sampling interval is in a range of 16 milliseconds to 32 milliseconds.

20. The system according to claim 14, wherein the plurality of feature extraction parameters comprise, at least one of a signal energy in each window period, a range of delta X coordinate values in each window period, a range of delta Y coordinate values in each window period, an area enclosed by the X and Y coordinates in each window period, a mean value of the Z coordinates in each window period, a standard deviation of the X coordinate values in a window period, and a standard deviation of the Y coordinate values in the window period.

\* \* \* \* \*